United States Patent [19]

Esfahani et al.

[11] Patent Number: 5,784,004
[45] Date of Patent: Jul. 21, 1998

[54] APPARATUSES AND SYSTEMS FOR REDUCING POWER CONSUMPTION IN REMOTE SENSING APPLICATIONS

[75] Inventors: Farhad Esfahani, Dallas, Tex.; James Lloyd Davis, Marlow; Robert L. Toellner, Duncan, both of Okla.

[73] Assignee: Gas Research Institute, Chicago, Ill.

[21] Appl. No.: 492,814

[22] Filed: Jun. 20, 1995

Related U.S. Application Data

[63] Continuation of Ser. No. 358,061, Dec. 13, 1994, abandoned.

[51] Int. Cl.$^6$ .................................................. G01V 3/00
[52] U.S. Cl. .............................. 340/854.6; 340/855.5; 340/588; 340/870.05; 340/870.16; 73/152.02; 175/40; 175/50; 166/250.01
[58] Field of Search ............................. 340/854.6, 855.5, 340/856.3, 588, 589, 870.17, 870.16, 853.6, 870.05, 853.9, 853.5; 73/152.02; 175/40, 45, 50; 166/250

[56] References Cited

U.S. PATENT DOCUMENTS

| | | | |
|---|---|---|---|
| 4,709,234 | 11/1987 | Forehand et al. | 181/103 |
| 4,873,522 | 10/1989 | Jurgens | 340/853.6 |
| 4,968,978 | 11/1990 | Stolarczyk | 340/854.6 |
| 5,319,965 | 6/1994 | Lynch et al. | 73/151 |
| 5,335,540 | 8/1994 | Bowler et al. | 73/146.5 |
| 5,467,083 | 11/1995 | McDonald et al. | 340/854.6 |

*Primary Examiner*—J. Woodrow Eldred
*Attorney, Agent, or Firm*—Thomas, Kayden, Horstemeyer & Risley LLP; Scott A. Horstemeyer

[57] ABSTRACT

The system of the subject invention includes an antenna system, a surface apparatus and a battery-powered remote apparatus useful for applications such as well bore telemetry. In well bore telemetry, the surface apparatus is located uphole on the earth's surface and the remote apparatus is positioned at a remote location downhole in a well bore. The remote apparatus includes a sensor/transmitter unit for sensing physical characteristics such as pressure and/or temperature. The remote apparatus conserves power stored in its battery by transmitting change-in-pressure and/or change-in-temperature data that requires less power for transmission than absolute pressure and/or temperature data. The remote apparatus also conserves power by transmitting absolute pressure data in a single data frame and transmitting absolute temperature data in portions in a series of data frames. The remote apparatus can transition between initial time delay, fixed transmit sequence, sleep, operation, and test states based on its control program and/or based upon the transmission of control data from the surface apparatus. The surface apparatus receives a main signal from the remote apparatus and a reference signal from the antenna system and uses the reference signal to remove noise components from the main signal.

6 Claims, 31 Drawing Sheets

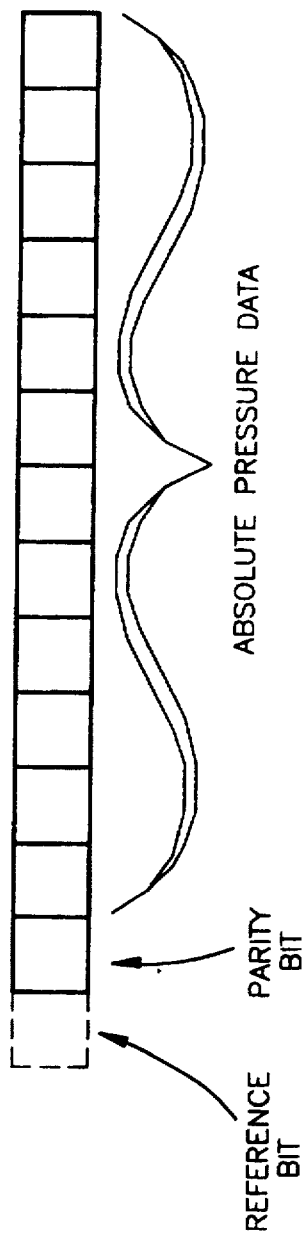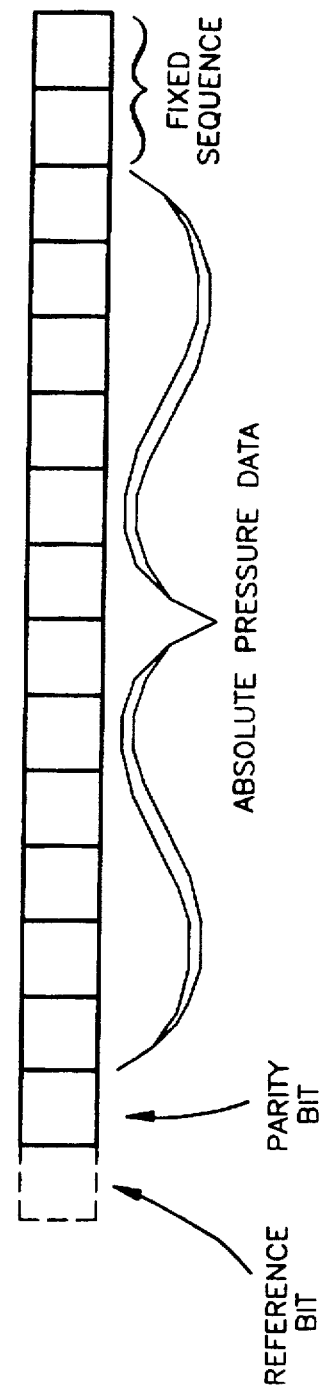

APPARATUSES AND SYSTEMS FOR REDUCING POWER CONSUMPTION IN REMOTE SENSING APPLICATIONS

This is a continuation of Ser. No. 08/358,061, filed Dec. 13, 1994, abandoned, under 37 C.F.R. §1.53(b).

BACKGROUND OF THE INVENTION

1. Field of the Invention

This invention is directed to apparatuses and systems for reducing power consumption in remote sensing applications.

2. Description of the Related Art

Many technologies require transmission of data from a sensor/transmitter device that has no access to a power source. Usually, this type of sensor/transmitter device is equipped with a battery to provide the power necessary for its operation. Particularly in applications in which the sensor/transmitter device is difficult and/or expensive to retrieve to replace its battery, conservation of battery power is an important consideration in the design and implementation of the sensor/transmitter device. Accordingly, any device or technique that can reduce the power consumed by this type of sensor/transmitter device would be desirable.

SUMMARY OF THE INVENTION

It is an object of the subject invention to reduce power consumption in remote sensing and transmitting applications.

Another object of the subject invention is to conserve power in the transmission of pressure and/or temperature data in a telemetry system.

A further object of the subject invention is to conserve power in transmission of pressure and/or temperature data in a telemetry system used to monitor the pressure and/or temperature of fluid pumped into oil- or gas-bearing geological strata for the recovery of oil or gas therefrom.

A further object of the subject invention is to conserve power in a telemetry system by transmitting change-in-pressure and/or change-in-temperature data.

A further object of the subject invention is to conserve power in a sensor/transmitter device by transmitting sensed data at bit rates appropriate for the sensed physical characteristic.

A further object of the subject invention is to conserve power in a sensor/transmitter device by transmitting sensed data for two or more sensed physical characteristics at different update rates appropriate for the sensed physical characteristics.

A further object of the subject invention is to conserve power in a telemetry system by transmitting pressure data or change-in-pressure data in serial frames while transmitting temperature data as sequential bits in the serial frames.

A further object of the subject invention is to conserve power in a sensor/transmitter device by transmitting only significant changes in a sensed physical characteristic.

A further object of the subject invention is to conserve power in a sensor/transmitter device by transmitting only non-redundant data for most transmission data frames.

These together with other objects and advantages are obtained by the subject invention disclosed herein. In accordance with one aspect of the subject invention, a telemetry antenna system is provided with first and second antenna rods arranged in the earth approximately along a first line including a well head. The first and second antenna rods are arranged on opposite sides of the well head and separated by a predetermined distance from the well head. Third and fourth antenna rods are arranged in the earth and each separated from the well head and separated from the well head by at least the predetermined distance. The first and second antenna rods can be used to derive a main signal, while the third and fourth antenna rods can be used to derive a reference signal used to eliminate noise components from the main signal.

In accordance with other aspects of the subject invention, a system includes surface and remote apparatuses. The surface apparatus is so called because it is arranged at the surface of the earth in well bore telemetry applications, and the remote apparatus is thus termed because in operation it is positioned at a remote down hole location relative to the surface apparatus. The remote apparatus is battery-powered and includes a sensor/transmitter unit. The sensor/transmitter unit can sense physical characteristics such as pressure and/or temperature at a remote location, and transmit pressure and temperature data to the surface apparatus. A transmitter of the sensor/transmitter unit is powered if pressure and/or temperature data is to be transmitted, and is not powered otherwise to conserve battery power. The remote apparatus also transmits change-in-pressure and change-in-temperature data with fewer bits than the bits needed to transmit absolute pressure and/or temperature data. The change-in-pressure or change-in-temperature data can be determined relative to a past temperature and/or pressure values or relative to extrapolated pressure and/or temperature values extrapolated from the past pressure and/or temperature values. Because the change-in-pressure and/or change-in-temperature data requires fewer bits for transmission then the bits needed for transmission of absolute pressure and/or temperature data, the remote apparatus uses less battery power in the transmission of change-in-pressure and/or change-in-temperature data relative to absolute pressure and/or temperature data. Further, the remote apparatus is capable of transmitting absolute pressure data in a single frame and of transmitting absolute temperature data in portions over a series of data frames. Because temperature is a relatively slow-changing phenomenon relative to pressure, the remote apparatus is able to avoid transmission of redundant temperature data and so reduce the power consumed by the remote apparatus and data transmission. The surface apparatus is structured and functions to decode the data frames received from the remote apparatus.

In accordance with a further aspect of the subject invention, the remote apparatus can be programmed or commanded by transmission of control data from the surface apparatus, to transition between various states. The states include an initial time delay state that allows an operator a time to set-up the system in accordance with the subject invention before any significant power is consumed by the remote apparatus, and an initial transmit sequence state in which the remote apparatus transmits fixed known sequences and sensed pressure and/or temperature data to a test device (preferably, the surface apparatus is programmed to perform as the testing device) to verify that the remote apparatus is operating properly. The states also include a sleep state in which the remote apparatus assumes a low-power consumption mode while the remote apparatus is being positioned in a remote location such as at a particular depth in a well bore, for example. The remote apparatus can also assume an operation state in which the remote apparatus actively transmits changes-in-pressure, change-in-temperature, absolute pressure and/or absolute temperature data. In addition, the remote apparatus can transition to a test state to allow an operator to test the remote apparatus to determine whether the remote apparatus is operating properly and so that the operator can set various parameters for operation of the remote apparatus. Preferably, the surface apparatus is programmed to perform testing of the remote apparatus in the test state.

These together with other objects and advantages, which will become subsequently apparent, reside in the details of construction and operation as more fully hereinafter described and claimed, reference being had to the accompanying drawings, forming a part hereof, wherein unlike numerals refer to like parts throughout.

BRIEF DESCRIPTION OF THE DRAWINGS

The present invention can be better understood with reference to the following drawings. The drawings are not necessarily to scale, emphasis instead being placed upon clearly illustrating principles of the present invention.

FIGS. 25B–25G are data frame formats used in formats 10 and/or 20 in accordance with the subject invention;

DESCRIPTION OF THE PREFERRED EMBODIMENTS

To provide a degree of clarity, the following description is based on a telemetry application of the subject invention. Of course, the subject invention can be applied to other applications without departing from the scope of the invention.

1. The System Hardware a. The Surface Apparatus

Figure 1:
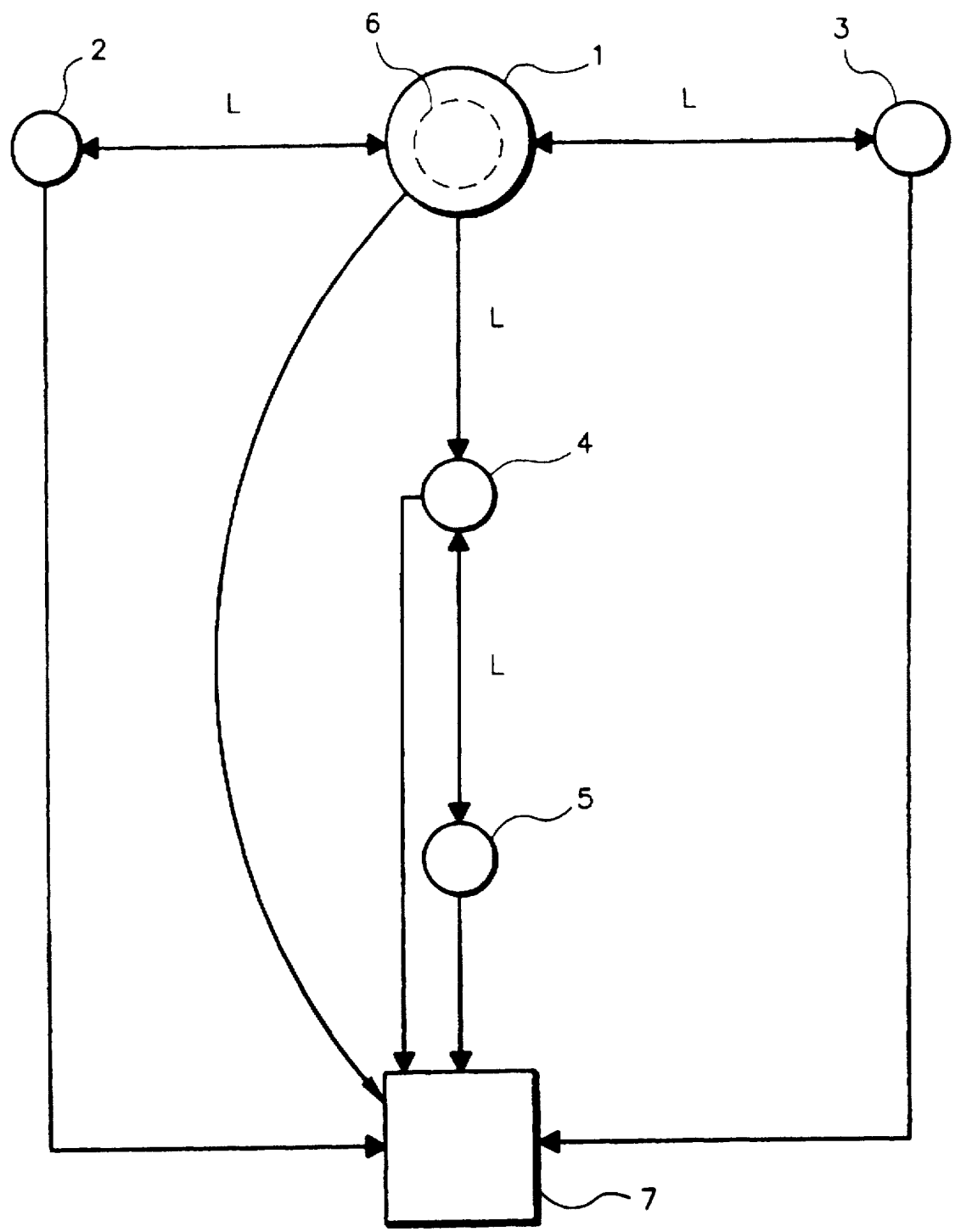
FIG. 1 is an elevational view of an antenna and receiver system at the surface in accordance with the subject invention.

FIG. 1 is an elevational view of a system in accordance with the subject invention. The perspective of FIG. 1 is an aerial view in which a well head 1 and antennas 2–5 are fixed in the earth's surface. Downhole relative to the well head 1 is a remote sensor/transmitter apparatus 6 in accordance with the subject invention. The remote sensor/transmitter apparatus 6 transmits signals including data regarding sensed physical characteristics such as pressure and/or temperature. The signal from the remote sensor/transmitter apparatus 6, is received by the array of antennas 2–5 shown in FIG. 1. The antennas 2 and 3 are arranged on opposite sides of the well head 1 and separated therefrom by a distance L. The antennas 2 and 3 are approximately arranged along a line including the well head 1. The antennas 2 and 3 are coupled to surface apparatus 7 and are used to generate a main signal including data transmitted by the remote apparatus 6.

Arranged away from the well head 1 by at least the predetermined distance L, are the antennas 4 and 5. The antennas 4 and 5 can be oriented by trial-and-error into a position best-suited to generate a reference signal including noise that is present in the area so that this noise can be eliminated (in FIG. 1, the antennas 4 and 5 are arranged on the same side of the well head 1 and spaced by a distance L and a distance 2L, respectively, from the well head 1, but other arrangements of the antennas 4 and 5 could be used). The antennas 4 and 5 are coupled to the surface apparatus 7 to provide the reference signal thereto.

The antennas 2–5 can be metal rods, for example, fixed in the ground and having wires electrically coupling the metal rods to the surface apparatus 7. To improve reception of the signal generated by the remote apparatus 6, an electrolytic solution such as rock salt or fertilizer and water, can be poured at the base of the antennas 2–5.

The selection of the distance L is based on two competing considerations. One consideration is that the strength of the electric current received by the antennas 2–5 is a function of the sine of the angle between the well bore and the length from the remote apparatus 6 to one of the antennas 2–4. Accordingly, this first consideration dictates that the distance L should be large so that the sine of the angle is likewise large. However, another consideration is that the signal received from the remote apparatus 6 is attenuated in the earth while propagating to the antennas 2–5. Therefore, if the distance L is large, the distance traveled by the signal through geological matter will also be large. Accordingly, a balance between these two competing considerations must be struck. The subject invention has been found to be effective with the remote apparatus 6 at 5,000 feet below the earth's surface, with a distance L of 220 feet. Of course, other choices for the distance L and the depth of the remote apparatus 6 can be used.

Figure 2:
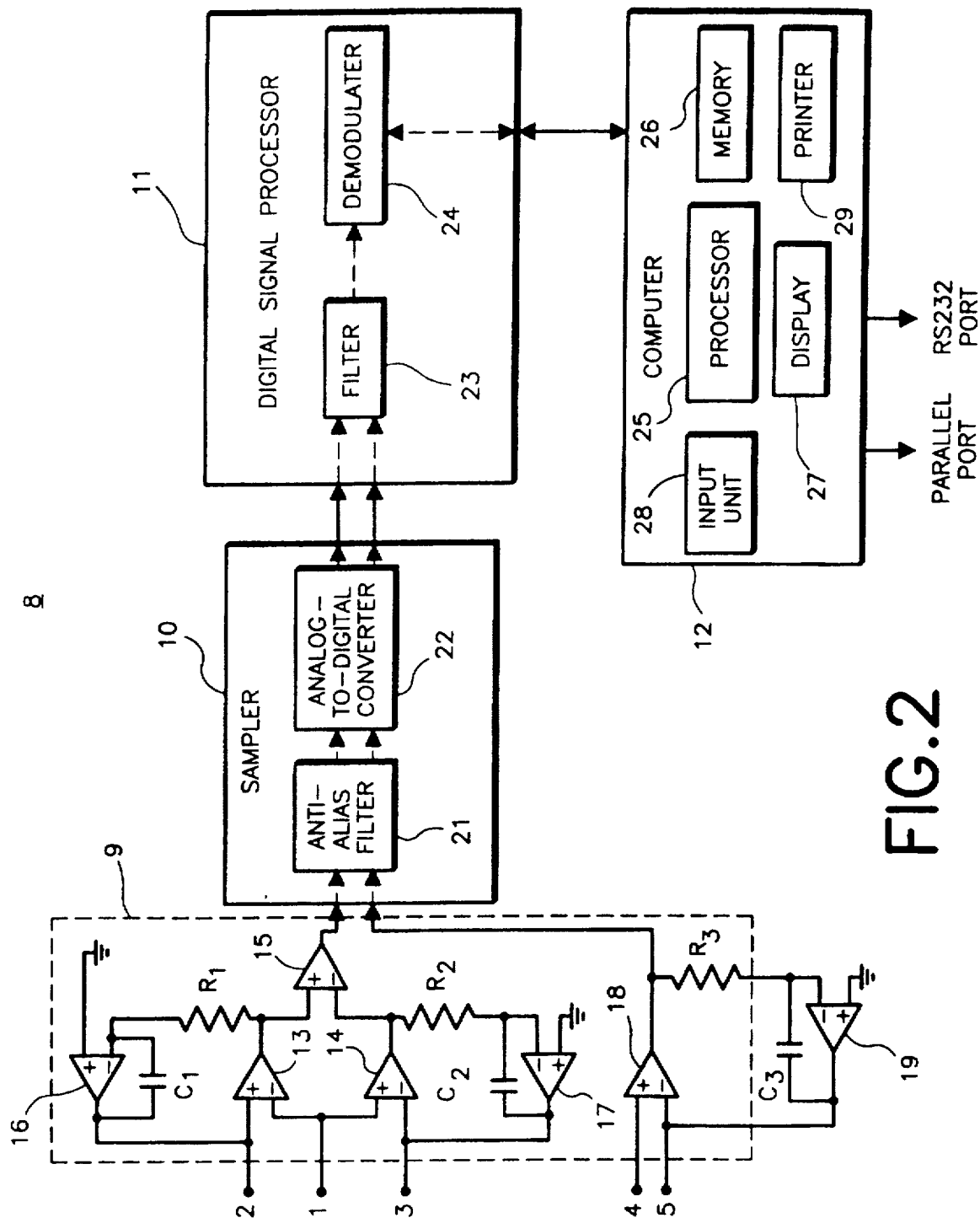
FIG. 2 is a block diagram of a portion of the surface apparatus including a receiver unit in accordance with the subject invention.

FIG. 2 is a block diagram of a portion of the surface apparatus 7 including receiver unit 8. The receiver unit 8 includes an amplifier unit 9, a sampler 10, and a digital signal processor 11. The receiver unit 8 of the surface apparatus 7 also includes a computer 12 coupled to the digital signal processor 11.

The amplifier unit 9 has five inputs, one coupled to the well head 1, and four coupled to respective antennas 2–5. The inputs to the amplifier 9 are coupled to the well head 1 and antennas 2–5 through a relay (not shown in FIG. 2, but shown in FIG. 3) that will be described later in this specification.

The amplifier unit 9 includes operational amplifiers 13–18. The operational amplifier 13 has a non-inverting terminal coupled to the antenna 2, and an inverting terminal coupled the well head 1. The operational amplifier 14 has a non-inverting terminal coupled to the antenna 3, and an inverting terminal coupled to the well head 1. The outputs of the operational amplifier 13, 14 are provided to non-inverting and inverting inputs, respectively, of the operational amplifier 15. The output of the operational amplifier 15 is coupled to one input of the sampler 10 to provide a main signal thereto.

A resistor $R_1$ is coupled between the output of the operational amplifier 13 and the inverting terminal of the operational amplifier 16. The non-inverting terminal of the operational amplifier 16 is coupled to ground, and a capacitor $C_1$ is coupled between the inverting terminal and the output of the operational amplifier 16. The output of the operational amplifier 16 is coupled to the non-inverting terminal of the operational amplifier 13. The resister $R_1$, the capacitor $C_1$ and the operational amplifier 16 serve to eliminate any offset in the output of the operational amplifier 13.

Similarly, a resistor $R_2$ is coupled between the output of the operational amplifier 14 and the inverting input of the operational amplifier 17. A capacitor $C_2$ is coupled across the inverting terminal and the output of the operational amplifier 17. The non-inverting terminal of the operational amplifier 17 is coupled to ground. The output of the operational amplifier 17 is coupled to the inverting terminal of the operational amplifier 14. The operational amplifier 17, the resistor $R_2$ and the capacitor $C_2$ function to eliminate any offset in the output of the operational amplifier 14.

The operational amplifier 18 has a non-inverting terminal coupled to the antenna 4 and an inverting terminal coupled to antenna 5. The output of the operational amplifier 18 is coupled to a second input of the sampler 10 to provide a reference signal thereto.

The sampler 10 includes an anti-alias filter 21 and an analog-to-digital converter 22. The sampler 10 is coupled to receive output signals from the operational amplifiers 15, 18. More specifically, the anti-alias filter 21 receives the main and reference signals from the amplifier unit 9 as inputs, and removes aliasing components in these signals. The anti-alias filter 21 outputs the signals after anti-alias filtering, to the analog-to-digital converter 22. The analog-to-digital converter 22 converts the output signals from the anti-alias filter 21, into digital signals. The sampler 10 is coupled to the digital signal processor 11 to provide the output signals from the analog-to-digital converter 22 to the digital signal processor 11. The sampler 10 can be any suitable component such as model number ZPD1007-001 manufactured by Burr-Brown, Inc.™.

The digital signal processor 11 includes filter 23 and demodulator 24. The digital signal processor 11 is coupled to the sampler 10 to receive the digital main and reference signals as inputs to the filter 23. The filter 23 performs various filtering and can include an adaptive filter to remove noise, an adaptive filter to remove D.C. bias and a low pass filter to attenuate 60 Hertz components of the digital main and reference signals. To perform this filtering, the filter 23 uses the digital reference signal to reduce the noise in the main signal. The filter 23 is coupled to the demodulator 24 to provide the filtered, digitized main signal thereto.

The demodulator 24 is coupled to the filter 23 to receive the filtered, digitized main signal. The demodulator 24 demodulates the main signal to generate a bit stream output. The demodulator 24 also can determine whether the bits are noise or signal and flag the bits accordingly. The digital signal processor 11 can be a component such as a model number ZPB34-004 manufactured by Burr-Brown, Inc.™.

The computer 12 is coupled to the digital signal processor 11 to receive the bit stream generated by the demodulator 24. The computer 12 can include components such as a processor 25, a memory 26, a display 27 an input unit 28 and/or a printer 29. Based on the bit stream received from the digital signal processor 11, the processor 25 can decode the bit stream received from the digital signal processor 11. Also, the processor 25 can store the bit stream in the memory 26 to maintain a record of the bit stream. Further, the processor 25 can generate a display for the display 27 or a print-out for the printer 29, based on the bit stream.

The input unit 28 of the computer 12 allows an operator to input control data to the computer 12 for control of the surface apparatus 7 and the remote apparatus 6. For example, an operator can manipulate the input unit 28 to input a carrier frequency, a data transmission format and/or a state of the remote apparatus 6. To perform these functions, the computer 12 can be coupled directly to the remote apparatus 6 through an RS232 port, or can transmit control data to the remote apparatus 6 using a transmitter unit 30 (not shown in FIG. 2, but shown in FIG. 3) described immediately below in this specification, through the parallel and RS232 ports. The computer 12 can be a personal computer.

Figure 3:
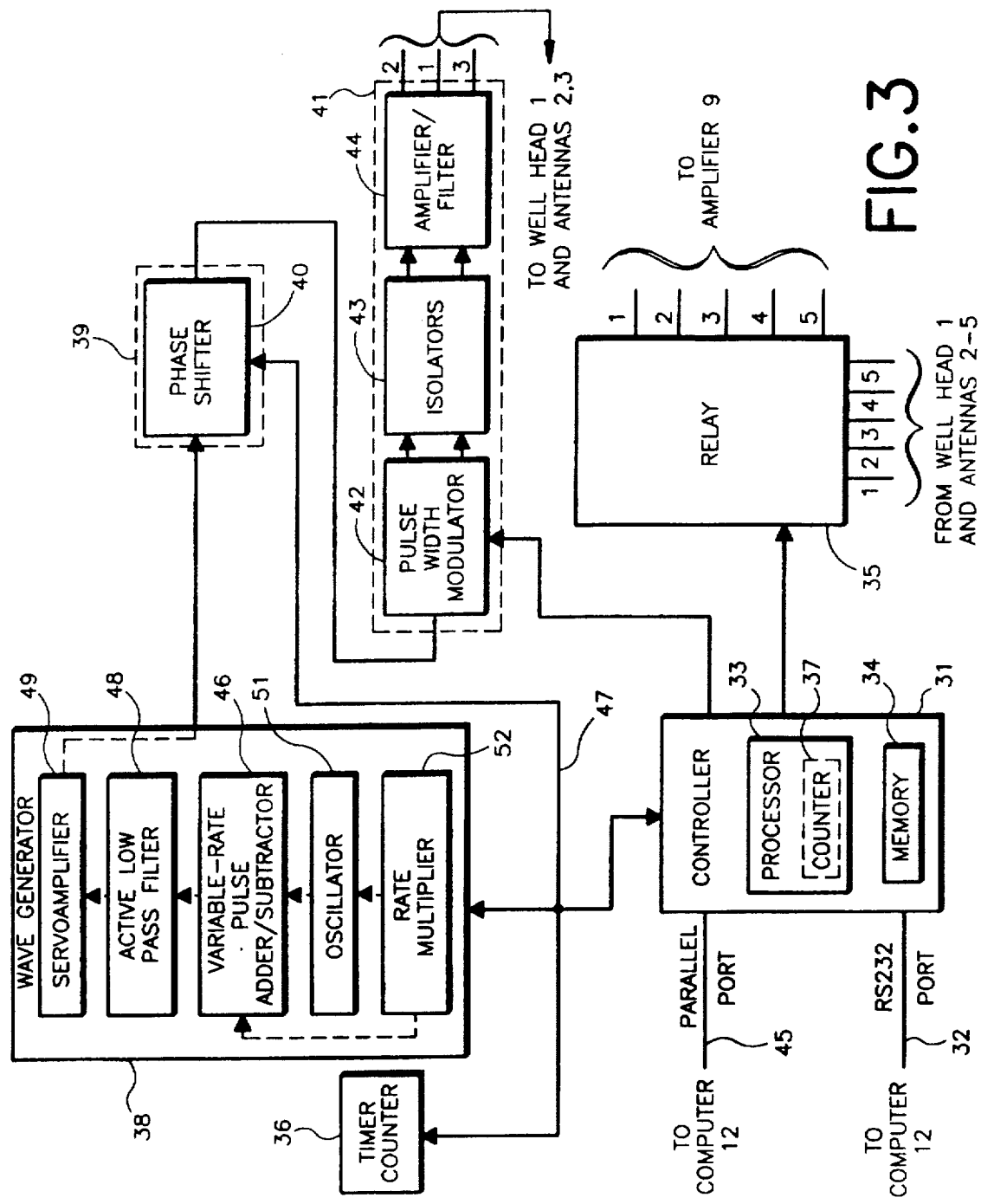
FIG. 3 is a block diagram of a transmitter unit of the surface apparatus in accordance with the subject invention.

FIG. 3 is a block diagram of the transmitter unit 30 of the surface apparatus 7. The transmitter unit 30 includes a controller 31 coupled to the computer 12 via parallel port bus 45 and RS232 port bus 32. The controller 31 includes a processor 33 (such as an OKI™, Inc. semiconductor MSM80C31FRS-1) and a memory 34 (including memories such as a Toshiba™, Inc. TC57512AD-15 EPROM and/or a Toshiba™, Inc. TC55257 BPI-10L SRAM) storing control programs for controlling the processor 33, temporary data generated by the processor 33 and permanent data needed by the processor 33 to perform functions dictated by the control programs.

The controller 31 is coupled to a relay 35 (such as a Porter-Brumfield™, Inc. R10E2Z6-V90). At its input side the relay 35 is coupled to the well head 1 and the antennas 2-5, while at its output side, the relay 35 is coupled to the amplifier unit 9 of the receiver unit 8. Based on a control instruction generated by the computer 12 when the surface apparatus 7 is to transmit control data to the remote apparatus 6, the computer 12 issues an instruction to the controller 31 directing it to control the relay 35 to decouple the inputs to the relay 35 from the outputs of the relay 35 so that the receiver unit 8 will not be damaged upon transmission of the control data from the transmitter unit 30. On the other hand, if the transmitter unit 30 is not to transmit data to the remote apparatus 6, the computer 12 generates and outputs a control instruction on the parallel port bus 45 to direct the controller 31 to control the relay 35 to couple the inputs to the outputs so that the receiver unit 8 can receive transmission data from the remote apparatus 6.

Coupled to a data bus 47 is a timer counter 36 (such as an Intel™, Inc. 82C54-2). The timer counter 36 can be used by controller 31 as a timer to time-stamp various data including, for example, an estimated phase angle determined by the demodulator 24 and provided to the controller 31 via the computer 12. Counter 37 is implemented in software and is internal to processor 33. The counter 37 is loaded with the number of bits in a control data word to be transmitted by the controller 31. The controller 31 decrements the counter 37 after transmission of each bit and deactivates the transmitter unit 30 when the counter 37 counts the number of bits to be transmitted.

The controller 31 is coupled to a wave generator 38. The wave generator 38 is preferably a variable frequency sine wave generator with a variable rate pulse adder/subtractor for affecting fine adjustments in the phase of the signal generated by the wave generator 38. Preferably, the wave generator 38 includes an oscillator 51, a rate multiplier 52, and a variable-rate pulse adder/subtractor 46, an active low pass filter 48 and a servo amplifier 49. The oscillator 51 generates a pulse signal. The rate multiplier 52 is coupled to the oscillator to receive the pulse signal, and generates a pulse signal with a frequency instructed by the controller 31. Thus, based on instruction data from the computer 12, the controller 31 can control the wave generator 38 to select a frequency for the carrier signal generated by the wave generator 38. Also, by receiving an estimated phase angle from the demodulator 24 via computer 12 that is time-stamped by the timer counter 36, the controller 31 can use its processor 33 under control of a control program stored in the memory 34, to generate a control signal to make fine adjustments in the phase of the carrier signal so that the transmission signal generated by the transmitter unit 30 will be in-phase with the remote apparatus 6. To perform this phase adjustment function, the controller 31 issues the control signal to the variable-rate pulse adder/subtractor 46 that is coupled to receive the outputs of the oscillator 51 and the rate multiplier 52. Based on the control signal and the outputs of the oscillator 51 and the rate multiplier 52, the variable-rate adder/subtractor 46 generates a pulsed output with a selected frequency and adjusted phase. The pulsed output is coupled to an active low pass filter 48 which smoothes the pulsed output to generate a filtered output. The filtered output is coupled to a servo amplifier 48 which preferably has a configuration like the operational amplifiers 13, 16, the resistor $R_1$ and the capacitor $C_1$ in FIG. 2 (modified to receive the pulsed output at the noninverting terminal and ground at the inverting terminal of the operational amplifier 13). The output of the servo amplifier 49 is coupled to a modulator 39.

Because phase-shift keying is preferred in the subject invention, the modulator 39 includes a phase shifter 40 (such as an ADOP-07 Operational Amplifier manufactured by Analog Devices™, Inc. used as an inverting or noninverting amplifier) for shifting the carrier signal by 0 or 180 degrees, depending on whether a logic "0" or "1" bit is to be transmitted. Of course, the modulator 39 could include other circuitry appropriate for other modulations schemes. However, differential phase-shift keying (DPSK) is preferred in the subject invention because this encoding/decoding scheme does not require the acquisition of a local reference signal in phase coherence with a received carrier signal, and accordingly reduces the time necessary to lock-on to a transmitted signal.

The phase shifter 40 receives control data from the controller 31 and modulates this control data in the carrier signal to generate a modulated signal. The modulator 39 is coupled to transmitter 41. Preferably, the transmitter 41 is a class D type amplifier but other amplifiers can be used. The transmitter 41 includes pulse width modulator 42 (such as an SG 1731 manufactured by Silicon General™, Inc.) isolators 43 and amplifier/filter 44 (the amplifier can include an IR2110L high-voltage MOS gate driver coupled to IRF 540 MOSFETS manufactured by International Rectifier™, Inc., and the filter can be an L-C (inductor-capacitor) circuit made from standard components). The pulse width modulator 42 is coupled to the modulator 39 to receive the modulated signal. The pulse width modulator 42 receives a signal from the controller 31 to enable or disable the transmitter 41. The pulse width modulator 42 generates differential outputs based on the modulated signal and the signal provided from the controller 31. The differential signals are provided to isolators 43 which can be opto-couplers such as HCPL-2231 manufactured by Hewlett-Packard™, Inc., for example. The outputs from the isolators 43 are provided to the amplifier/filter 44 for amplification and filtering to generate an output signal provided to the well head 1 and the antennas 2, 3. After decoupling the inputs of the relay 35 from its outputs, the carrier signal generated by the wave generator 38 is modulated in the modulator 39, amplified in the transmitter 41 and transmitted using well head 1 and antennas 2, 3. As each bit of the control data is transmitted, the controller 38 decrements the number of bits in the software or internal counter 37 until the controller 38 determines that all bits in the control word have been transmitted. Control data is thus transmitted in a transmission signal to the remote apparatus 6.

Figure 4:
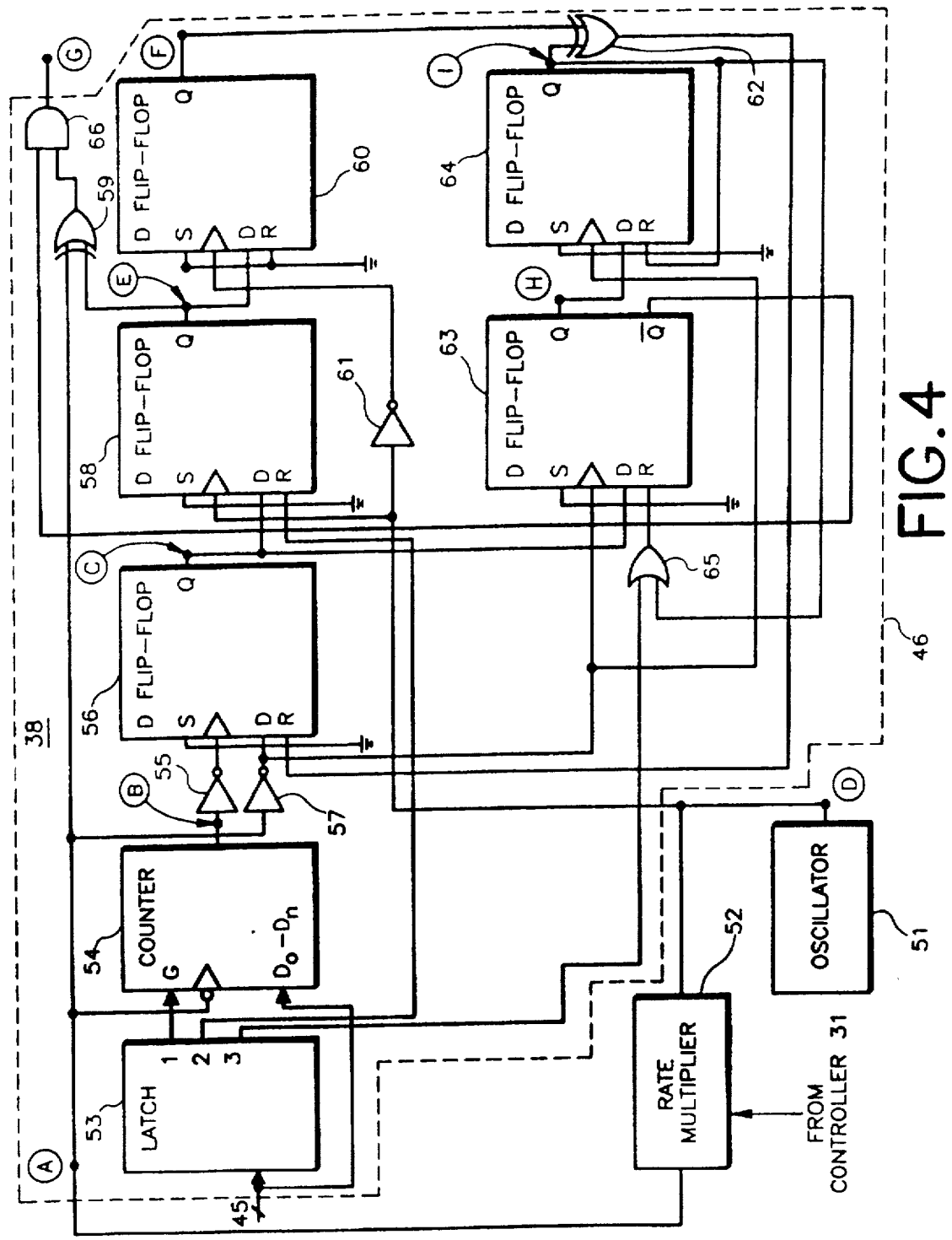
FIG. 4 is a block diagram of a portion of a wave generator of the surface apparatus in accordance with the subject invention.

FIG. 4 is a block diagram of a portion of the wave generator 38 of FIG. 3. More specifically, the portion of the wave generator 38 in FIG. 4 includes the oscillator 51, the rate multiplier 52, and the variable rate pulse adder/subtractor. The oscillator 51 as designed is a piezoelectric crystal generating an electric signal with a frequency of 2 megahertz (such as a CITSA-2.000 MHZ manufactured by Hi-Temp Research Labs™, Inc.). Of course, the oscillator 51 can be implemented to generate an electric signal with other frequencies. A rate multiplier 52 is coupled to the oscillator 51 to receive its output signal. Based on the output signal from the oscillator 51, the rate multiplier 52 generates an output signal with a frequency instructed by the controller 31. The rate multiplier 52 can be a binary-coded decimal (BCD) rate multiplier such as a CD4527B manufactured by Motorola™, Inc. Both the output signal from the rate multiplier 52 and the output signal from the oscillator 51 are used by components of the variable rate pulse adder/subtractor 46.

The variable rate pulse adder/subtractor 46 includes a latch 53 (for example, a 54H6273 manufactured by Texas Instruments™, Inc.) receiving three bits from the bus 45. The first bit from the bus 45 is latched in the latch 53 and output from pin 1 of the latch 53 to enable counter 54 (for example, a 82C54 manufactured by Intel™, Inc.) to begin counting. The second bit from the bus 45 is latched in the latch 53 and output from pin 2 to disable the pulse addition portion of the phase adjuster 46 if pulses are to be subtracted from the output signal from the rate multiplier 52 to retard the phase of the carrier signal. The third bit from the bus 45 is latched in the latch 53 and output from pin 3 to disable the pulse subtraction portion of the phase adjuster 46 if pulses are to be added to the output signal from the rate multiplier 52 to advance the phase of the carrier signal. The data bus 47 is also coupled to the counter 54 so that data for the desired divisor of the counter can be input to the counter 54. The counter 54 receives at its negative edge-triggered clock input the output signal from the rate multiplier 52, and the counter 54 outputs an output signal which is a version of the output signal from the rate multiplier 52 divided by the divisor data input to the counter 54. The output of the counter 54 is provided to an inverter 55 with an output coupled to the edge-triggered clock input of D flip-flop 56 (for example, a CD4013 manufactured by National Semiconductor™, Inc.). The set terminal S of the D flip-flop 56 is tied to ground. An inverter 57 has its input coupled to the output of the rate multiplier 52, and the output of the inverter 57 is input to the data input D of the D flip-flop 56. The output Q of the D flip-flop 56 is provided to the data terminal D of D flip-flop 58 (for example, a CD4013 manufactured by National Semiconductor™, Inc.). The edge-triggered clock input of the D flip-flop 58 is coupled to the output of the oscillator 51. The set terminal S of the D flip-flop 58 is tied to ground and the reset terminal R of the D flip-flop 58 is coupled to receive the output of pin 2 of the latch 53 for disabling the pulse addition portion of the phase adjuster 46 if a pulse subtraction operation is to be performed on the output signal from the rate multiplier 52. The output terminal Q of the D flip-flop 58 is tied to a first input of the exclusive-or gate 59 (such as a CD4070 manufactured by National Semiconductor™, Inc.) and a data terminal D of D flip-flop 60 (for example, a CD4013 manufactured by National Semiconductor™, Inc.). Inverter 61 has its input coupled to the output of the oscillator 51, and the output of the inverter 61 is provided to the edge-triggered clock input of the D flip-flop 60. The set terminal S and the reset terminal R of the D flip-flop 60 are both tied to ground. The output terminal Q of the D flip-flop 60 is coupled to a first input of the exclusive-or gate 62. At its edge-triggered clock input, D flip-flop 63 (such as a CD4013 manufactured by National Semiconductor™, Inc.) is coupled to the output of the inverter 57. The output terminal Q of the D flip-flop 56 is coupled to the data terminal D of the D flip-flop 63. The set terminal S of the D flip-flop 63 is tied to ground. The output terminal Q of the D flip-flop 63 is coupled to the data input terminal D of D flip-flop 64 (for example, a 4013 manufactured by National Semiconductor™, Inc.). The edge-triggered clock input terminal of the D flip-flop 64 is coupled to the output of the inverter 57. The set terminal S of the D flip-flop 64 is tied to ground, and the output terminal Q of the D flip-flop 64 is coupled to the reset terminal R thereof. The output terminal Q of the D flip-flop 64 is also coupled to the second input of the exclusive-or gate 62 whose output terminal is coupled to the reset terminal R of the D flip-flop 56. The output terminal Q of the D flip-flop 64 is also coupled to a first input of OR gate 65. The other input of the or gate 65 is pin 3 of the latch 53. The output of the or gate 65 is coupled to the reset terminal of the D flip-flop 63 so that the pulse subtraction portion of the variable rate pulse adder/subtractor 46 is disabled or reset based on the data at pin 3 of the latch 53 or the state of the output terminal Q of the D flip-flop 64. The output terminal Q of the flip-flop 63 is coupled to a first input of AND gate 66 (for example, a CD4081 manufactured by National Semiconductor™, Inc.). The exclusive-or gate 59 receives as inputs the output terminal Q of the D flip-flop 58 and the output of the rate multiplier 52. The output of the exclusive-or gate 59 is coupled to the second input terminal of the and gate 66. The output of the AND gate 66 is the output for the variable rate pulse adder/subtractor 46 and will have more or less pulses than the output of the rate multiplier 52 depending upon whether the phase of the carrier signal is to be advanced or retarded, respectively. Specifically, if the phase of the carrier signal is to be advanced, the controller 31 will use the data bus 47 to write divisor data into the $D_0$–$D_n$ inputs of the counter 54. This divisor data is proportional to the amount of phase to be added to the carrier signal. The controller 31 then writes a "101" into the latch 53 to enable the counter 54, enable the pulse addition portion of the phase adjuster 46 and disable the pulse subtraction portion of the phase adjuster 46, respectively. The output of the and gate 66 will have additional pulses relative to the output of the rate multiplier 52 and proportional to the divisor data. On the other hand, if the phase of the carrier signal is to be retarded, the controller 31 writes divisor data into the $D_0$–$D_n$ inputs of the counter 54 and writes a "110" into the latch 53 to enable the counter 54, disable the addition portion of the phase adjuster 46 and enable the pulse subtraction portion of the phase adjuster 46. The output of the and gate 66 will then have less pulses relative to the output of the rate multiplier 52 so that the phase of the carrier signal will be retarded in phase.

Figure 5:
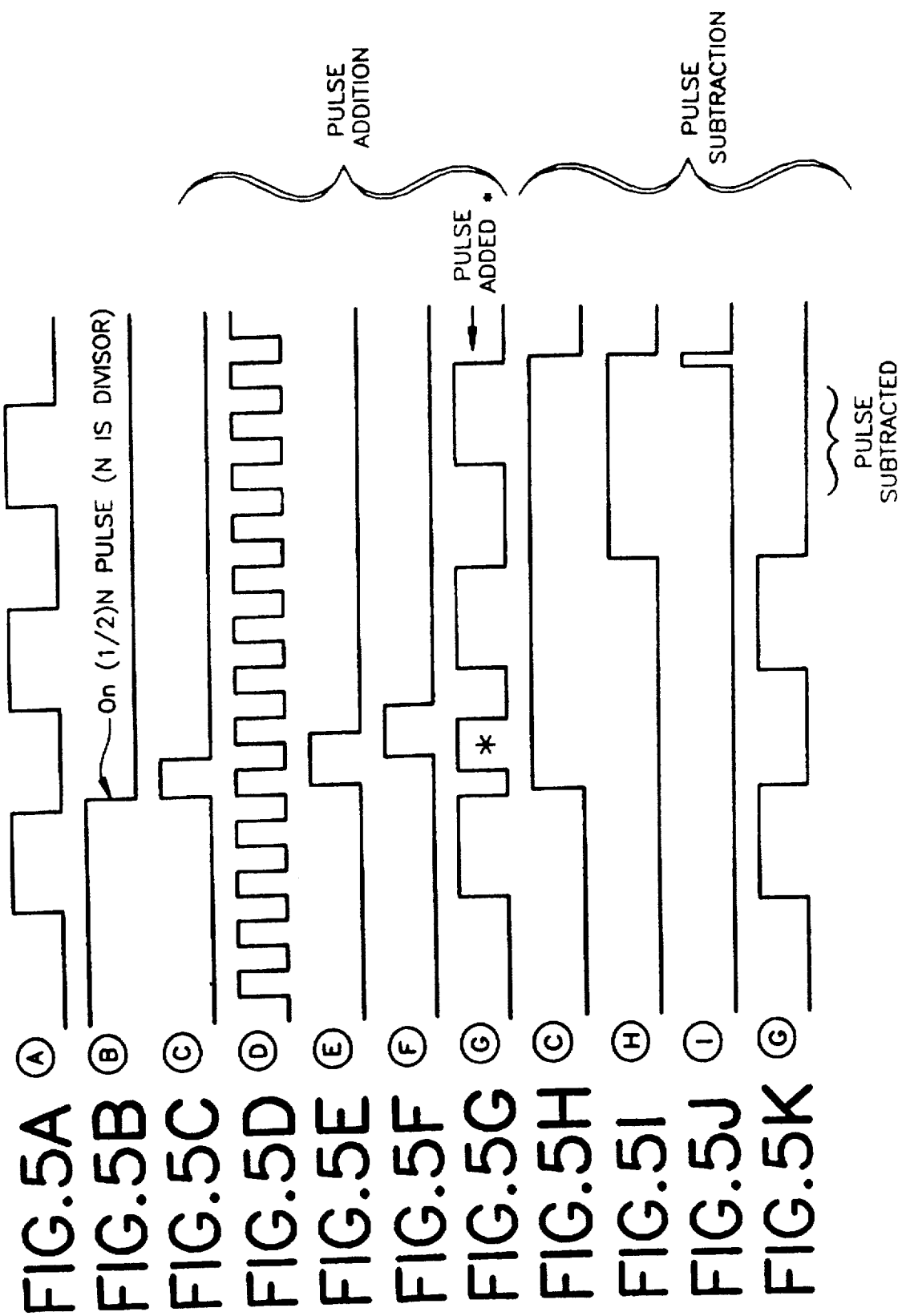
FIGS. 5A–5K are timing diagrams for the variable rate pulse adder/subtractor in the wave generator of the surface apparatus in accordance with the subject invention.

FIGS. 5A–5K are timing diagrams for the variable rate pulse adder/subtractor 46 of FIG. 4. FIG. 5A is timing diagram showing the signal at node which is the output of the rate multiplier 52. The frequency of the signal at node Ⓐ is determined by the controller 31. The controller 31 also determines the frequency of the signal at node Ⓑ of FIG. 5B output from the counter 54 by using divisor data. On the falling edge of the signal at node Ⓑ, the signal at node Ⓒ of FIG. 5C at the output of the D flip-flop 56 will go to a logic high state for a short time. The D flip-flop 58 receives at its clock input the output of the oscillator 51 at node Ⓓ as shown in FIG. 5D. Accordingly, node Ⓔ shown in FIG. 5E at the output terminal Q of the flip-flop 58, goes high for one period of the clock signal at node Ⓓ. Because the signal at node Ⓔ is provided to the D terminal input of the D flip-flop 60, the output terminal Q of the D flip-flop 60 at node Ⓕ is as shown in FIG. 5F. The signal at node Ⓕ resets the pulse addition circuit of the phase adjuster 46. The signal at node Ⓔ propagates through the exclusive-or gate 59 and the and gate 66 and its output at node Ⓖ is as shown in FIG. 5G. Here, the pulse with the asterisk (*) indicates the pulse added to the signal at node Ⓐ of FIG. 5A output from the rate multiplier 52.

In the pulse subtraction operation, FIGS. 5A and 5B are the same as in the pulse addition operation, but the signal at node Ⓒ is as shown in FIG. 5H. Thus, at node Ⓒ, the output terminal Q of the D flip-flop 56 will remain high for three falling edges of input Ⓐ. At node Ⓗ in FIG. 5I, node Ⓗ will be high from the second to the third falling edge of the input Ⓐ after the output of the counter 54 at node Ⓐ goes low on the falling edge of node Ⓐ. Thus, the output of terminal Q of the D flip-flop 63 will be held low to force the output of the and gate 66 to be low. Because the signal at node Ⓗ is provided to the data input terminal D of the D flip-flop 64, and because the output terminal Q of the D flip-flop 64 is fed back to its reset terminal R, the signal at node Ⓘ shown in FIG. 5J will be a very short duration pulse resetting the phase adjuster 46 so that a pulse is effectively subtracted from the output of the rate multiplier 52 output from the gate 66 at node Ⓖ in FIG. 5K. Thus, a pulse originally in the output signal from the rate multiplier 52 is effectively subtracted from the signal output from the gate 66 so that the phase of the carrier signal can be retarded. The output from the AND gate 66 is coupled to the active low pass filter 48 (see FIG. 3).

b. The Remote Apparatus

Figure 6:
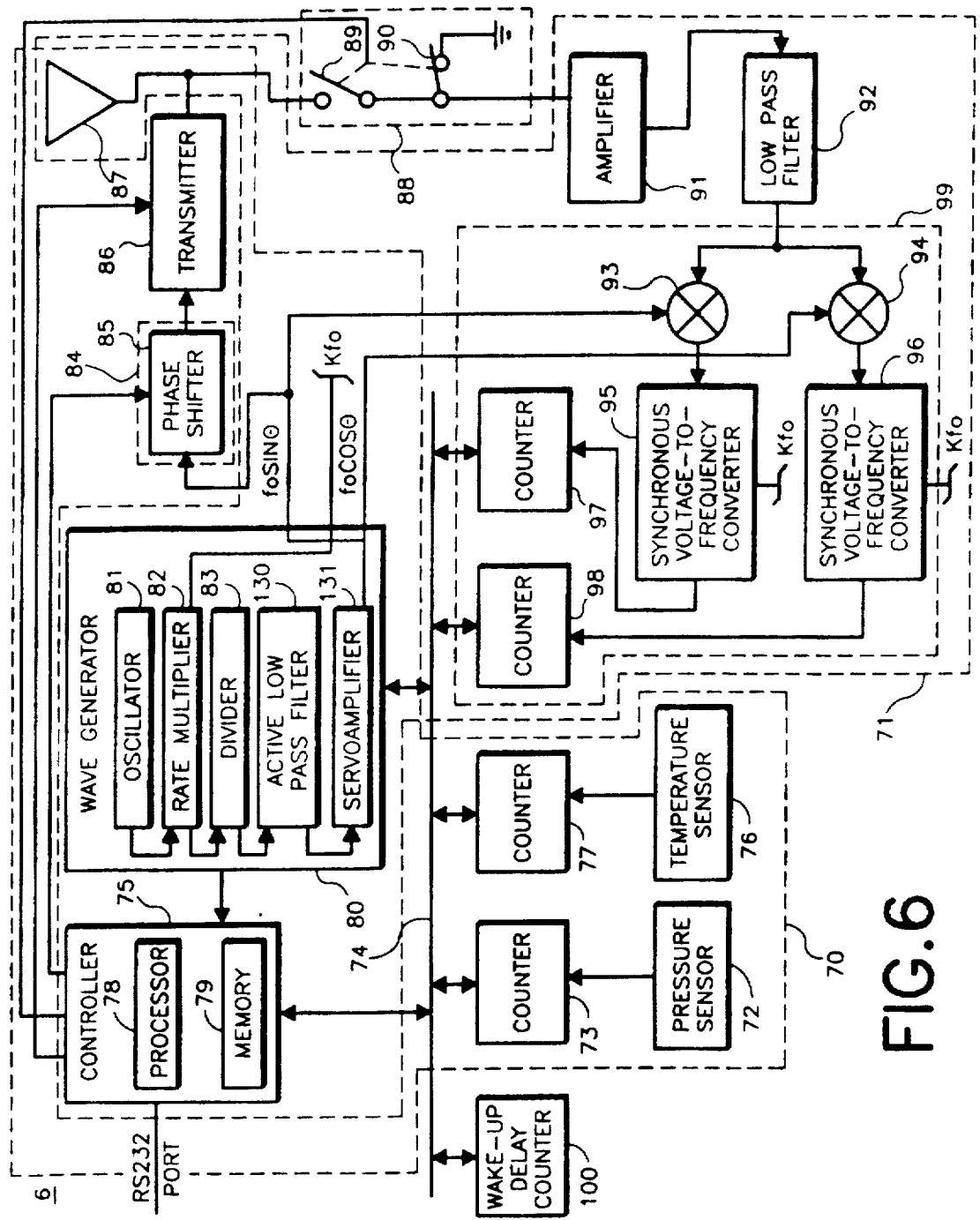
FIG. 6 is a block diagram of a remote apparatus in accordance with the subject invention.

FIG. 6 is a block diagram of the remote apparatus 6 in accordance with the subject invention. The remote apparatus 6 includes a sensor/transmitter unit 70 and a receiver unit 71. The sensor/transmitter unit 70 includes a pressure sensor 72 which outputs a stream of pulses whose frequency is proportional to the sensed pressure. The pressure sensor 72 can be a part of a combination pressure/temperature sensor 67500610 manufactured by Halliburton Energy Services™, Inc. Of course, other pressure sensors can be used including types which do not output a stream of pulses. However, because the pressure sensor 72 of FIG. 6 is implemented to output a stream of pulses, a counter 73 (such as an 82C54-Z manufactured by Intel™, Inc.) is coupled to the pressure sensor 72 to receive the stream of pulses. Based on the stream of pulses, the counter 73 is incremented. The counter 73 is coupled to bus 74 so that controller 75 can use the bus 74 to access the pressure count data stored in the counter 73.

The sensor/transmitter unit 70 also includes the temperature sensor 76. The output of the temperature sensor 76 is a stream of pulses proportional to the temperature sensed by the temperature sensor 76. The temperature sensor 76 was implemented as a part of a combination pressure/temperature sensor 67500610 manufactured by Halliburton Energy Services™, Inc., although other types of temperature sensors could be used including types which do not generate a pulse output. However, because the temperature sensor 76 does generate a pulse output as implemented, the temperature sensor 76 is coupled to a counter 77 (such as an 82C54-Z manufactured by Intel™, Inc.). The counter 77 generates temperature count data based on the pulses received from the temperature sensor 76. The output of the counter 77 is coupled to the bus 74 so that the controller 75 can access the temperature count data stored in the counter 77.

The controller 75 is coupled to the bus 74 and includes a processor 78 (such as an MSM80C31 FRS-1 manufactured by OKI Semiconductor™, Inc.) which can be implemented as a microprocessor or a microcontroller, for example. The controller 75 also includes a memory 79 (such as a TC57512AD-15 EPROM and a TC55257-BPI-101 SRAM manufactured by Toshiba™, Inc.) that can include read-only memory (ROM) and/or random access memory (RAM). The memory 79 stores various control programs to control operations performed by the processor 78. For example, the control programs stored in the memory 79 include a program to convert the pressure count data from the counter 73 into an engineering value, a program to convert the temperature count data from the counter 77 into an engineering value, a program to determine differences between pressure and temperature values sensed at different times, a program to determine differences between sensed temperature and pressure values at a given time and extrapolated pressure and temperature values extrapolated to the given time, programs for building frame data, a program to set a frequency of the carrier signal, and programs that limit the amount of power used by the sensor/transmitter unit 70. The controller 75 also includes an RS232 port to provide an interface so that the remote apparatus 6 can be coupled to an external unit for purposes, for example, of testing the remote apparatus 6 to ensure proper operation before the remote apparatus 6 is positioned where no direct connection can be made, such as, for example, downhole in a well bore.

The sensor/transmitter unit 70 of the remote apparatus 6 also includes a wave generator 80. The wave generator 80 includes an oscillator 81 which generates an electric signal with a stable frequency. For example, the oscillator 81 can be a piezo electric crystal, such as a CITSA-2,000 MHz manufactured by Hi-Temp Research Labs™, Inc., although other suitable oscillators can be used. The output signal of the oscillator 81 is provided to a rate multiplier 82. For example, the rate multiplier 82 can be a CD4527B manufactured by Motorola™, Inc. Based on the output signal from the oscillator 81, the rate multiplier 82 generates a signal whose frequency can be selected by data supplied from the controller 75 on the bus 74. The output of the rate multiplier 82 is output from the wave generator 80 as the signal $Kf_0$ where K is a constant and $f_0$ is the frequency of the carrier signal. The wave generator 80 was implemented with a constant K≈20,000, although other choices of K can be used. The frequency $f_0$ of the carrier signal depends upon the application for the remote apparatus 6. In well bore telemetry, the carrier signal $f_0$ is chosen to be relatively low, for example, about 3 Hertz, because low frequency signals propagate with less alternation through geological matter than do higher frequency signals. The output of the rate multiplier 82 is also provided to a divider 83 which divides the signal by the constant K. The output of the divider 83 is coupled to an active low pass filter 130 for smoothing, and the filtered output is coupled to a servo amplifier 131 (that can be realized, for example, in a manner similar to the operational amplifiers 13, 16, the resistor $R_1$ and the capacitor $C_1$ of FIG. 2 with the filtered input provided to the non-inverting terminal and ground being provided to the inverting terminal of the operational amplifier 13). The output of the servo amplifier 131 is signal $f_0\sin\theta$. The signal $f_0\sin\theta$ is not the product of $f_0$ and $\sin\theta$, but merely indicates that the signal $f_0\sin\theta$ has a phase following a sine wave. By suitably delaying or advancing the phase of the signal $f_0\sin\theta$, the output signal $f_0\cos\theta$ can also be generated by the wave generator 80. The signal $f_0\cos\theta$ is not the product of $f_0$ and $\cos\theta$, but merely indicates that the signal $f_0\cos\theta$ is 90° out-of-phase relative to the signal $f_0\sin\theta$. The signal $f_0\cos\theta$ can be generated using a gate delay or integrator, for example. Because the remote apparatus 6 preferably uses differential phase shift keying (DPSK), the signals $f_0\sin\theta$ and $f_0\cos\theta$ are supplied to the receiver unit 71 for demodulation. However, other demodulation schemes can be used without departing from the scope of the subject invention.

In the sensor/transmitter unit 70, the signal $f_0\sin\theta$ is provided to a modulator 84. In the subject invention, differential phase-shift keying (DPSK) is preferred for modulation, so the modulator 84 includes a phase shifter 85 (such as an AD OP-OT operational amplifier manufactured by Analog Devices™, Inc., used as an inverting or non-inverting amplifier). Based on frame data generated by the processor 78 and memory 79 of the controller 75, the controller 75 phase-shift keys the phase shifter 85 preferably by adjusting the phase of the signal $f_0\sin\theta$ by 0° or 180° depending upon whether a logic "0" of "1" is to be transmitted. The output of the modulator 84 is coupled to transmitter 86 for amplification to generate a transmission signal. Importantly, the transmitter 86 is selectively powered under control of the controller 75. Specifically, when the controller 75 is prepared to transmit a data frame, the controller 75 will set in a counter stored in the memory 79, a number of bits of data included in the data frame. The controller 75 will then activate the transmitter 86 and modulate the carrier signal generated by the wave generator 80 using the modulator 84. As each bit of the frame data is transmitted, the controller 75 decrements the counter until the controller 75 determines that all bits of the frame data have been transmitted based on the count value stored in the memory 79. At this time, the controller 75 will turn off the power provided to the transmitter 86 to conserve the battery (not shown in FIG. 6). More specifically, the controller 75 disables the output drivers of the pulse width modulator 119 (FIG. 8) so that MOSFETs coupled to the batteries and included in the drivers and commutators 121 are turned OFF. Accordingly, in this state, no power is supplied by the batteries to the transmitter 86. Because differential phase-shift keying (DPSK) does not require synchronization of a carrier signal to a reference signal, the transmitter 86 can be powered for less time than coherent-reference systems so that battery power is conserved. Because the transmitter 86 consumes most of the power in the remote apparatus 6, the reduction of the time for powering the transmitter 86 is desirable to reduce power consumption. The transmission signal generated by the transmitter 86 is transmitted to the surface apparatus 7 using an antenna 87. Because the transmission signal generated by the transmitter 86 is relatively high-powered, the remote apparatus 6 has a relay unit 88 controlled by the controller 75 to decouple the input of the receiver unit 71 from the antenna 87 when the sensor/transmitter unit 70 is transmitting data. The relay unit 88 includes first and second poles 89, 90. The first pole 89 is coupled between the antenna 87 and the input of the receiver unit 71. The first pole 89 is closed under control of the controller 75 when the sensor/transmitter unit 70 is not transmitting data, and is opened under control of the controller 75 when the sensor/transmitter unit 70 is transmitting data. The second pole 90 is coupled between the input to the receiver unit 71 and ground. The second pole 90 is closed under control of the controller 75 when the sensor/transmitter unit 70 is transmitting data, and is opened under control of the controller 75 when the sensor/transmitter unit 70 is not transmitting data.

The receiver unit 71 includes an amplifier 91 with an input coupled to the antenna 87 via the relay unit 88. The output of the amplifier 91 is provided to a low pass filter 92 to attenuate high-frequency components in the signal from the amplifier 91. The output of the low pass filter 92 is coupled to respective inputs of the multipliers 93, 94. The multipliers 93, 94 also receive as inputs the signals $f_0\sin\theta$ and $f_0\cos\theta$, respectively, from the wave generator 80. The multipliers 93, 94 can be implemented as model number AD632 multipliers manufactured by Analog Devices, Inc.™

The outputs of the multipliers 93, 94 are provided to respective inputs of synchronous voltage-to-frequency converters 95, 96. The synchronous voltage-to-frequency converters 95, 96 can be model number AD652 converters manufactured by Analog Devices, Inc.™ The synchronous voltage-to-frequency converters 95, 96 also receive the signal $Kf_0$ generated by the wave generator 80 as respective inputs. The outputs of the synchronous voltage-to-frequency converters 95, 96 are provided to respective inputs of counters 97, 98. Using the count value obtained in the counters 97, 98 attained over an integration period of one carrier cycle, the controller 75 can determine whether the input received by the receiver unit 71 is noise or signal. Also, the controller 75 can determine whether the bits in a signal are logic "1" or "0" based on the count value obtained in the counters 97, 98.

The multipliers 93, 94, the synchronous voltage-to-frequency converters 95, 96 and the counter 97, 98 are collectively termed a demodulator 99. Although the demodulator 99 in FIG. 6 is adapted to demodulate differential phase-shift key (DPSK) signals, other demodulators could be used in the subject invention.

Although not part of the sensor/transmitter unit 70 or the receiver unit 71, the remote apparatus 6 includes a wake-up delay counter 100 which can be programmed by external connection using the RS232 port of the controller 75 or by transmitting control data to the receiver unit 71. The controller 75 can thus be controlled to deactivate the transmitter 86 to conserve battery power until the wake-up delay counter 100 finishes counting and generates an interrupt to pull the processor 78 out of the sleep mode. The wake-up delay counter 100 is useful for conserving battery power while the remote apparatus 6 is positioned, for example, while the remote apparatus 6 is run in a well bore on pipe.

Figure 7:
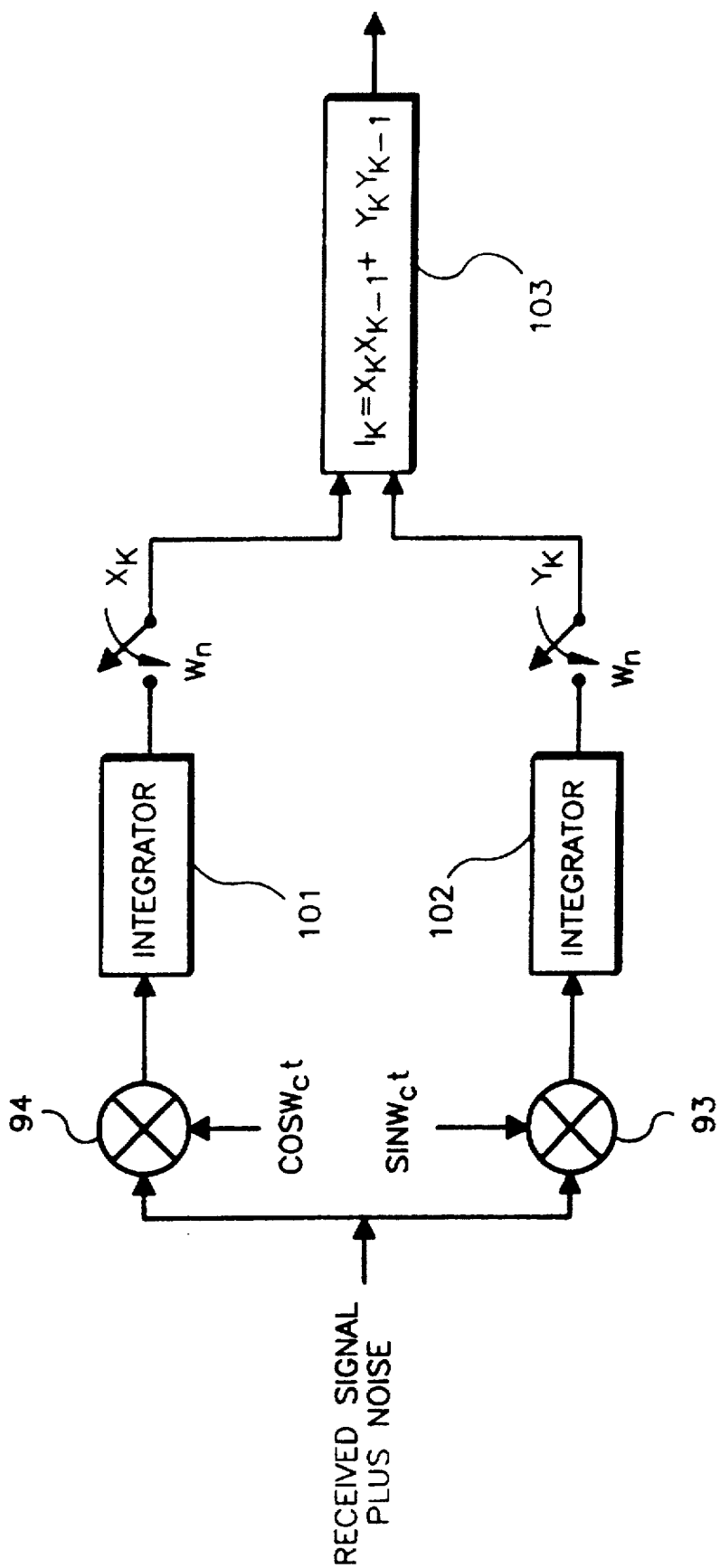
FIG. 7 is a block diagram of an ideal differential phase-shift key (DPSK) demodulator in accordance with the subject invention.

To provide a better understanding of the demodulator 99, FIG. 7 shows an ideal DPSK demodulator. The input from the low pass filter 92 is labeled "received signal plus noise" in FIG. 7. This signal is multiplied by the signals $\cos\omega_c t$ and $\sin\omega_c t$ in the multipliers 94, 93, respectively. In FIG. 7, the synchronous voltage-to-frequency converter 95 and the counter 97 of FIG. 6 are effectively included together in integrator 101. Similarly, the synchronous voltage-to-frequency converter 96 and the counter 98 of FIG. 7 are effectively included together as integrator 102. The integrators 101 and 102 integrate the outputs of the multipliers 94, 93 over an integration period. The integration period should be equal to the modulation period. As realized, the modulation period was made equal to the period of the carrier signal. The outputs of the integrators 101, 102 are then sampled at a rate $\omega_n$ to generate $x_k$ and $y_k$ which are then provided to the controller 75 which performs the logic of block 103. Specifically, the controller 75 determines $l_k = x_k x_{k-1} + y_k y_{k-1}$. By determining $\Delta l = l_k - l_{k-1}$ and determining whether the absolute value of $\Delta l$ is greater than a predetermined value, the controller 75 is able to conclude whether the input to the receiver unit 71 is noise (if $|\Delta l|$ less than or equal to the predetermined value) or signal ($|\Delta l|$ is greater than the predetermined value). Further, if $l_k$ is greater than the predetermined value, a logic "1" has been transmitted. On the other hand, if $l_k$ is less than the predetermined value, a logic "0" has been transmitted.

Figure 8:
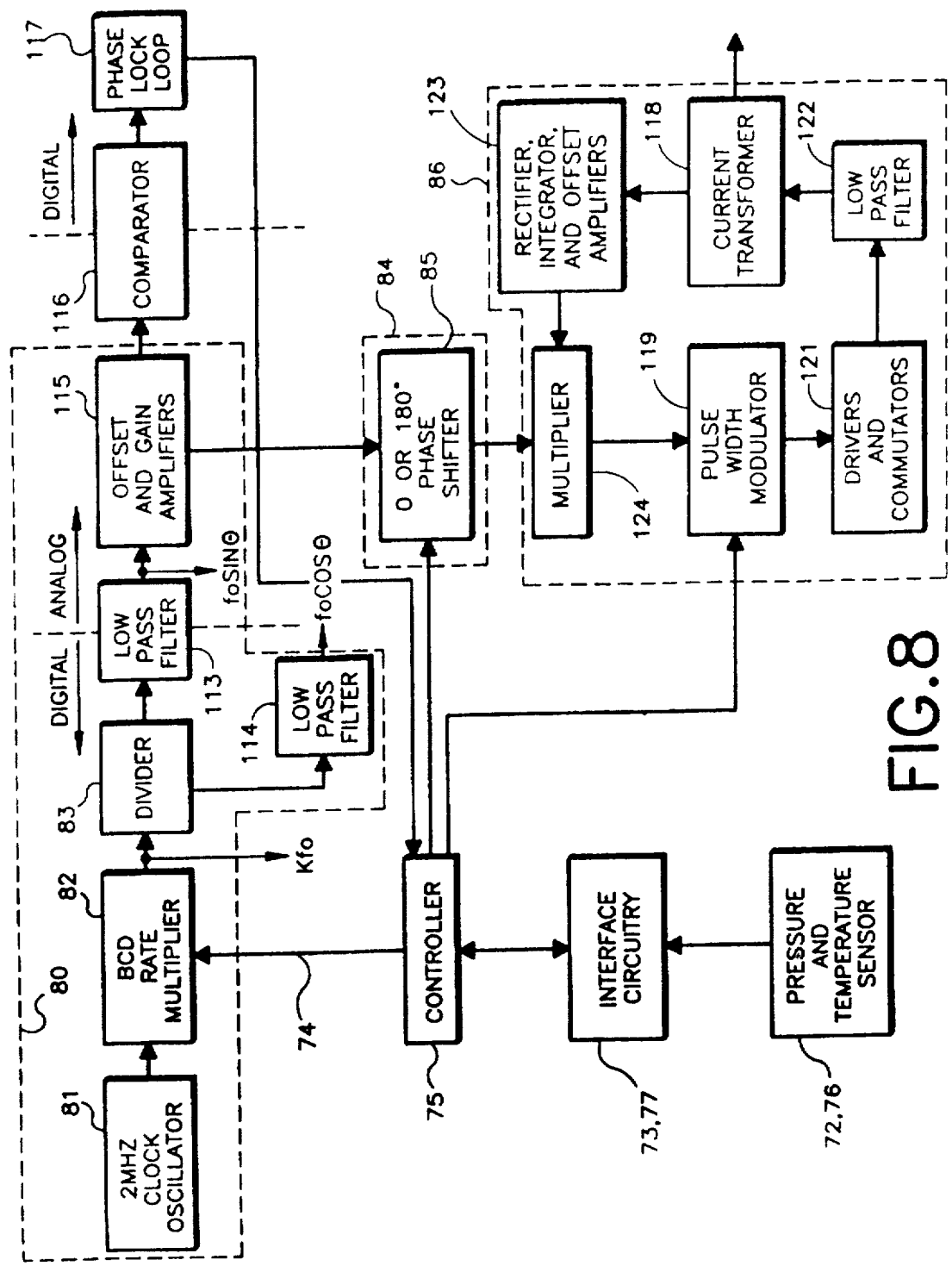
FIG. 8 is a block diagram of a sensor/transmitter unit of the remote apparatus in accordance with the subject invention.
Figure 9A:
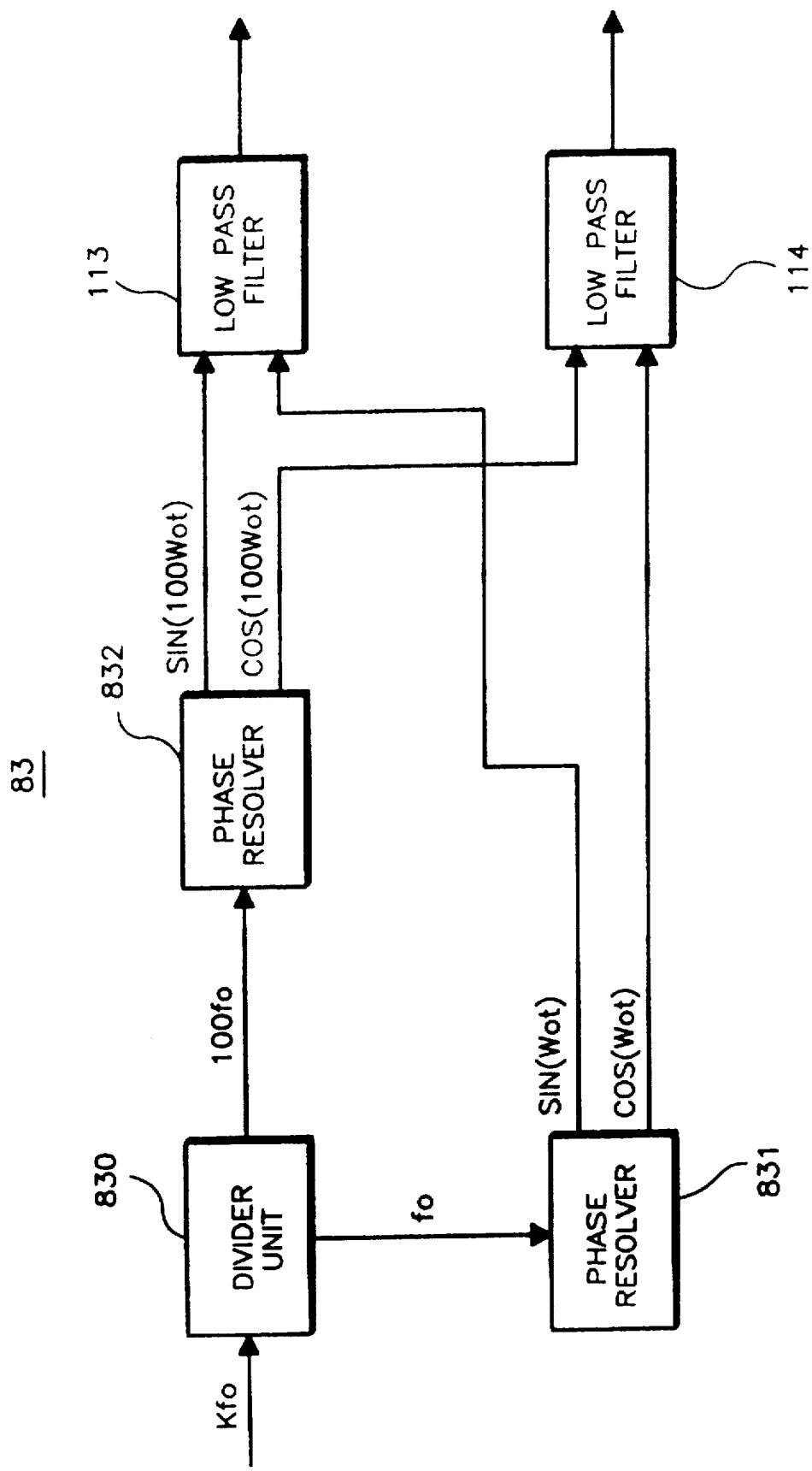
FIG. 9A is a block diagram of a divider included in the wave generator of the sensor/transmitter unit.
Figure 9B:
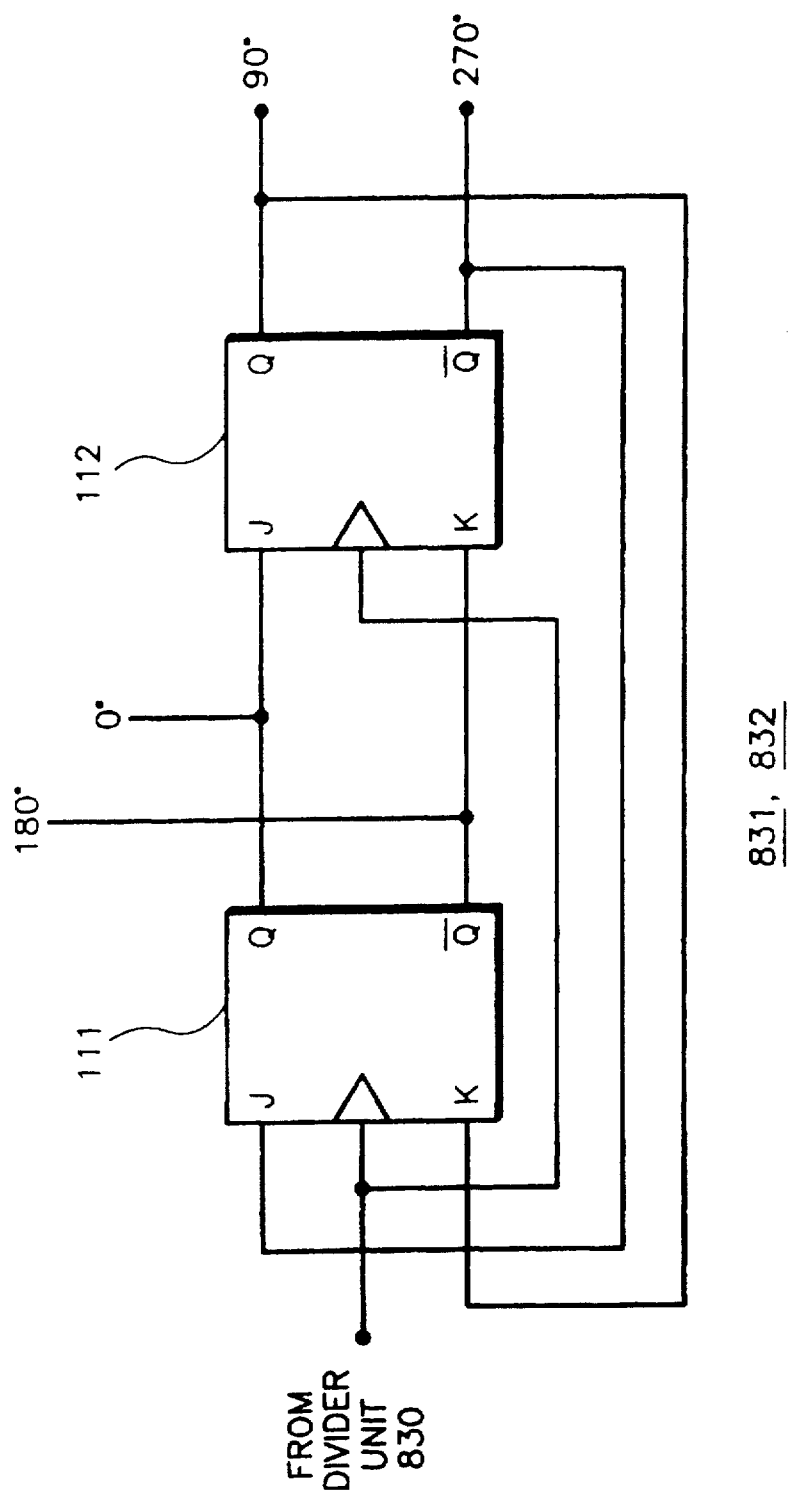
FIG. 9B is a block diagram of phase-resolver circuit for generating square waves that are 0°, 90°, 180° and 270° out-of-phase in accordance with the subject invention.

FIG. 8 is a block diagram showing an embodiment of the sensor/transmitter unit 70 of FIG. 6. In FIG. 8, the wave generator 80 includes the oscillator 81 generating an electric signal with a frequency of 2 MhZ. The oscillator 81 is coupled to the binary-coded decimal (BCD) rate multiplier 82, which generates an output signal $Kf_0$ with a frequency based on data provided from the controller 75 on the bus 74. The output of the BCD rate multiplier 82 is coupled to divider 83 which frequency-divides the signal $Kf_0$. A preferred embodiment of the divider 83 is illustrated in FIG. 9A. The divider 83 includes a divider unit 830 that can include a cascade of counters of flip-flops coupled to receive the output of the BCD rate multiplier 82 as the clock input thereof. Preferably, the divider unit 830 generates two signals $f_o$ and $100f_o$ that are needed for the preferred type of low pass filters 113, 114 used in this invention (the use of the two signals $f_o$ and $100f_o$ may not be necessary if other types of low pass filters 113, 114 are used). The divider unit 830 is coupled to phase resolver circuits 831, 832 to provide the signals $f_o$ and $100f_o$, respectively, thereto. Each phase resolver circuit 831, 832 can be constructed as shown in FIG. 9B, and serves to generate two square waves that are 90° out-of-phase based on respective outputs of the divider unit 830. In FIG. 9B, J-K flip-flops 111, 112 receive one output of the divider unit 830, at their clock inputs. The J terminal of the flip-flop 111 is coupled to receive the output terminal $\overline{Q}$ the J-K flip-flop 112. The K terminal of the J-K flip-flop 111 is coupled to the Q output terminal of the J-K flip-flop 112. The output terminal Q of the J-K flip-flop 111 is coupled to the J terminal of the J-K flip-flop 112 and the $\overline{Q}$ terminal of the J-K flip-flop 111 is coupled to the K terminal of the J-K flip-flop 112. The output terminal of the Q terminal of the J-K flip-flop 111 has a 0° phase, the output of the Q terminal of the J-K flip-flop 112 has a 90° phase, the output $\overline{Q}$ terminal of the J-K flip-flop 111 has a 180° phase, and the output terminal $\overline{Q}$ of the J-K flip-flop 112 has a 270° phase. Accordingly, the output terminal Q of the J-K flip-flop 111 and the output terminal Q of the J-K flip-flop 112 can be coupled to respective low pass filters 113, 114, for generation of the signals $f_o \sin\theta$ and $f_o \cos\theta$, or $100f_o \sin\theta$ and $100f_o \cos\theta$, by attenuating the high frequency components of the square waves generated by the divider unit 830. The low pass filters 113, 114 can be filters such as the LMF100 manufactured by National Semiconductor, Inc.™. The output signal $f_o \sin\theta$ is provided to offset and gain amplifiers 115 to eliminate D.C. offset and to generate an amplified output based on the input signal $f_o \sin\theta$. The offset and gain amplifiers 115 can include an operational amplifier(s) with offset removal circuitry similar to the operational amplifier 16, the resistor $R_1$ and the capacitor $C_1$ of FIG. 2, for example. The amplified output signal is then provided to the modulator 84 including the phase shifter 85 (for example, an AD OP-0T operational amplifier manufactured by Analog Devices™, Inc. used as an inverting or non-inverting amplifier) for phase-shift keying by modulating the phase of the signal from the offset and gain amplifiers 115 by 0° or 180°. The output of the offset and gain amplifiers 115 is also coupled to comparator 116 to generate a digital square wave signal. The digital square wave signal is received by phase lock loop 117 for feeding back noise information to the controller 75. Although the low pass filter 113, the offset and gain amplifiers 115, the comparator 116 and the phase lock loop 117 are not shown in FIG. 6, these components were implemented in the embodiment of the sensor/transmitter unit 70 to perform wave-shaping, offset adjustment and to provide a phase reference to the controller 75 so that modulation can be performed more than once per period of the carrier signal. If the carrier signal is to be modulated only once per cycle, the phase lock loop 117 simply indicates a zero-crossing to the controller 75 when the phase crosses 0° for example.

The transmitter 86 is coupled to the modulator 84 and the controller 75. In the embodiment of FIG. 8, the transmitter 86 is similar to the transmitter described in U.S. Pat. No. 5,187,473 to Robert J. Guest (especially FIG. 10 with the "sensing means" column 8, lines 37–39 being realized as current transformer 118). The controller 75 activates the transmitter 86 by activating pulse width modulator 119 (in U.S. Pat. No. 5,187,473, the pulse width modulator 119 is a block labeled duty cycle 32). When activated by the controller 75, the pulse width modulator 119 generates an output signal based on the input signal from multiplier 120. The output of the pulse width modulator 119 is coupled to drivers and commutators 121 (the drivers and commutators 121 correspond to the gates 26, 28 and commutated clamp 36 of FIG. 10 of U.S. Pat. No. 5,187,473). The output of the drivers and commutators 121 is coupled to low pass filter 122 (the low pass filter 122 can be considered an integrator such as the integrator 30 of U.S. Pat. No. 5,187,473). The output of the low pass filter 122 is coupled to the current transformer 118 having an output coupled to the antenna 87 (not shown in FIG. 8). A current output of the current transformer 118 is provided to rectifier, integrator and offset amplifiers 123 (blocks 56, 58 and 60 of FIG. 10 of U.S. Pat. No. 5,187,473). The output of the rectifier, integrator and offset amplifiers 123 is provided to multiplier 124 (the multiplier 124 corresponds to variable gain 54 in FIG. 10 of U.S. Pat. No. 5,187,473). The multiplier 124 is also coupled to the modulator 84 to receive its output signal. The output of the multiplier 124 is coupled to the input of the pulse width modulator 119.

In FIG. 8, the pressure and temperature sensors 72, 76 and interface circuitry 73, 77 can be realized as elements similar to corresponding elements in FIG. 6.

2. Synchronization Software

To ensure that the receiver unit 71 of the remote apparatus 6 will be able to detect control data sent from the surface apparatus 7, the transmitter unit 30 of the surface apparatus 7 must be synchronized with the receiver unit 71. More specifically, the carrier signal generated by the transmitter unit 30 of the surface apparatus 7 must be relatively close to the frequency and phase of the signal $f_0 \sin\theta$ and $f_0 \cos\theta$ used to demodulate the control data in the demodulator 99 of the remote apparatus 6. As previously explained with respect to FIG. 4, the transmitter unit 30 of the surface apparatus 7 is capable of making adjustments to the carrier signal generated by the wave generator 38. The software aspects of synchronization of the remote apparatus 6 and the surface apparatus 7 are addressed as follows with reference to FIGS. 10–14.

Figure 10:
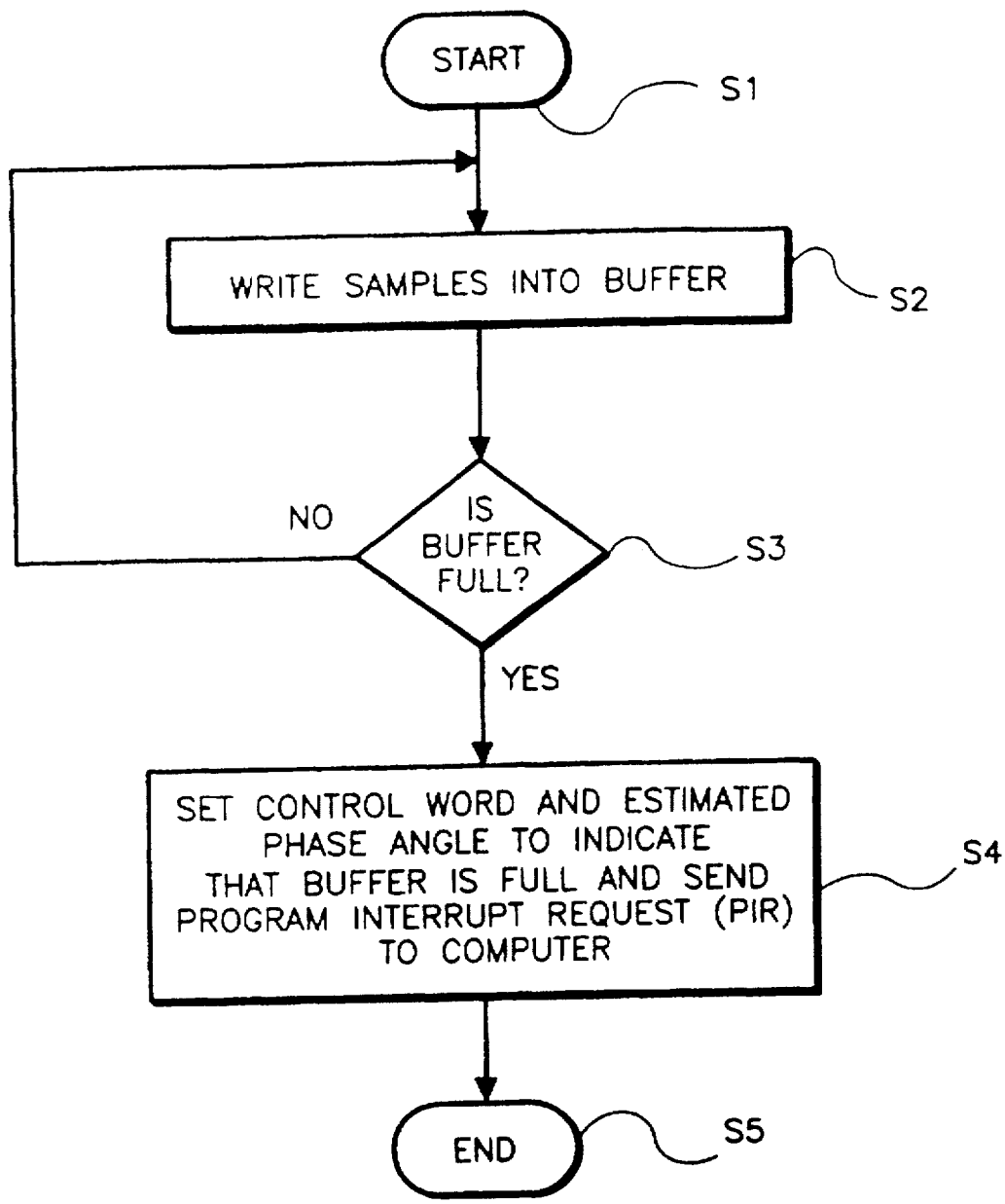
FIG. 10 is a flow chart of processing performed by the digital signal processor for synchronization with the remote apparatus in accordance with the subject invention.

In FIG. 10, processing performed by the digital signal processor 11 of FIG. 2 begins in step S1. In step S2, the digital signal processor 11 writes samples received from the sampler 10 into its buffer. In step S3 of FIG. 10, the digital signal processor 11 determines whether the buffer is full. If not, step S2 of FIG. 10 is repeated. On the other hand, if the buffer is full in step S3, the digital signal processor 11 sets a control word and the estimated phase angle in a dual-ported memory location and sends a program interrupt request (PIR) to the computer 12 in step S3 of FIG. 10. In step S5 of FIG. 10, processing performed by the digital signal processor 11 in conjunction with the synchronization process ends.

Figure 11:
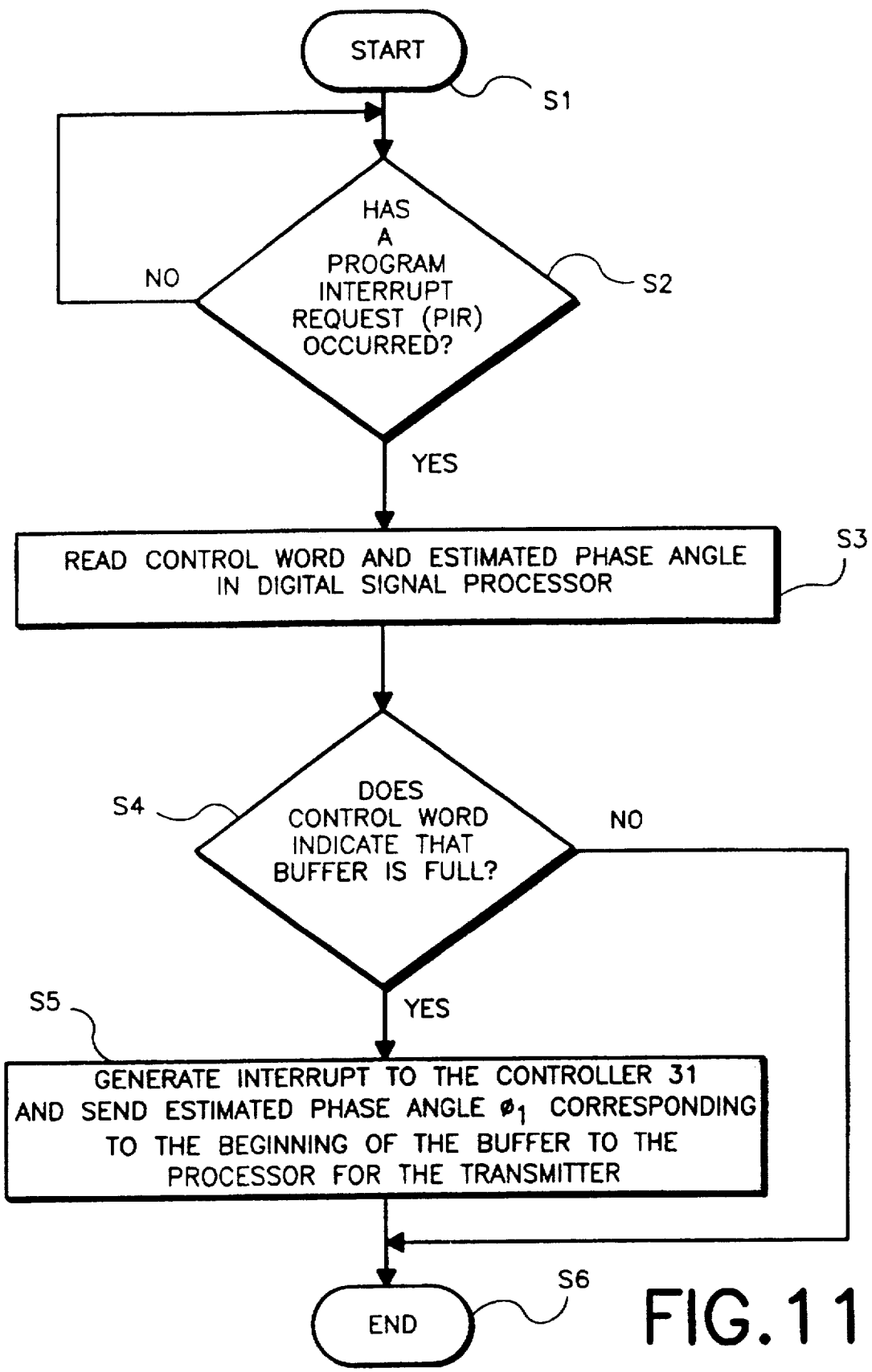
FIG. 11 is a flow chart of processing performed by a computer for synchronization with the remote apparatus in accordance with the subject invention.

In step S1 of FIG. 11, processing performed in the synchronization process by the computer 12 begins in step S1. In step S2, the computer 12 determines whether a program interrupt request (PIR) has occurred. If not, the computer 12 will repeat step S2 of FIG. 11 at a later time. On the other hand, if the computer 12 determines that a PIR has occurred in step S2, the computer 12 will read the control word and estimated phase angle $\phi_1$ from the digital signal processor 11 in step S3 of FIG. 11. In step S4 of FIG. 11, the computer 12 determines whether the control word indicates that the buffer is full. This determination is necessary so that the computer 12 can distinguish between different kinds of control words. If the computer 12 determines in step S4 that the control word does indicate that the buffer is full, processing proceeds to step S5 of FIG. 11. In step S5, the computer 12 generates an interrupt to controller 31 and sends the estimated phase angle $\phi_1$ corresponding to the beginning of the buffer of the digital signal processor 11 to the controller 31 of the transmitter 30. After step S5, processing performed by the computer 12 ends in step S6. Also, if step S4 determines that the control word does not indicate that the buffer is full, processing performed by the computer 12 will also end in step S6.

Figure 12:
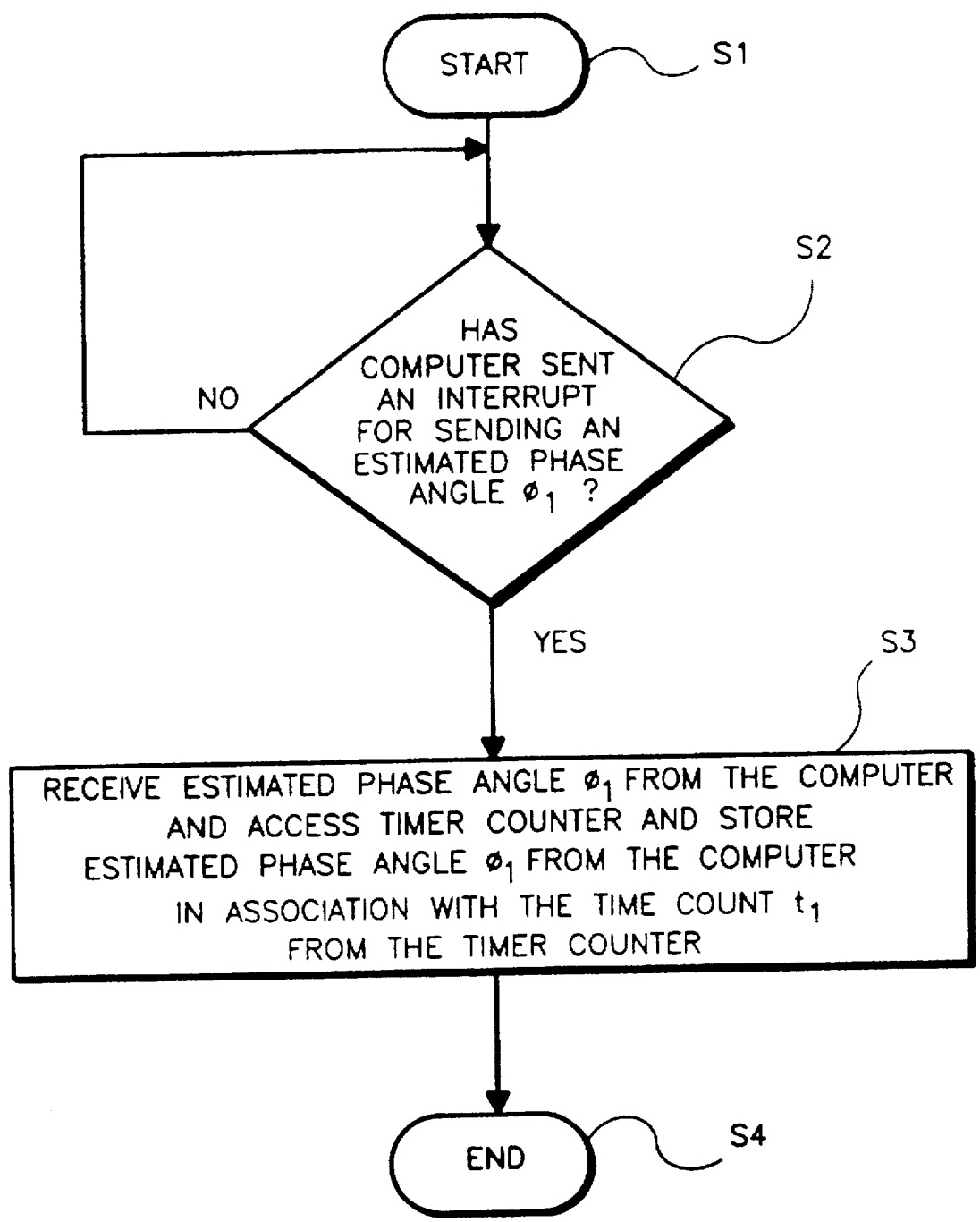
FIG. 12 is a flow chart of processing performed by a processor of the controller for the transmitter unit of the surface apparatus for synchronization with the remote apparatus in accordance with the subject invention.

FIG. 12 is a flow chart of processing performed by the processor 33 of the controller 31 in the synchronization process. In step S1 of FIG. 12, processing performed by the processor 33 begins. In step S2 of FIG. 12, the processor 33 determines whether the computer 12 has sensed an interrupt to send an estimated phase angle $\phi_1$. If not, the processor 33 will perform step 2 of FIG. 12 at a later time. On the other hand, if the computer 12 has generated an interrupt for sending the estimated phase angle $\phi_1$, the processor 33 will receive the estimated phase angle $\phi_1$ from the computer 12 and access the timer counter 36 and store the estimated phase angle $\phi_1$ in the memory 34 in association with the time count $t_1$ from timer counter 36. In step S4, processing performed by the processor 33 to acquire an estimated phase angle $\phi_1$ and time count $t_1$ ends in step S4 FIG. 12.

Figure 13:
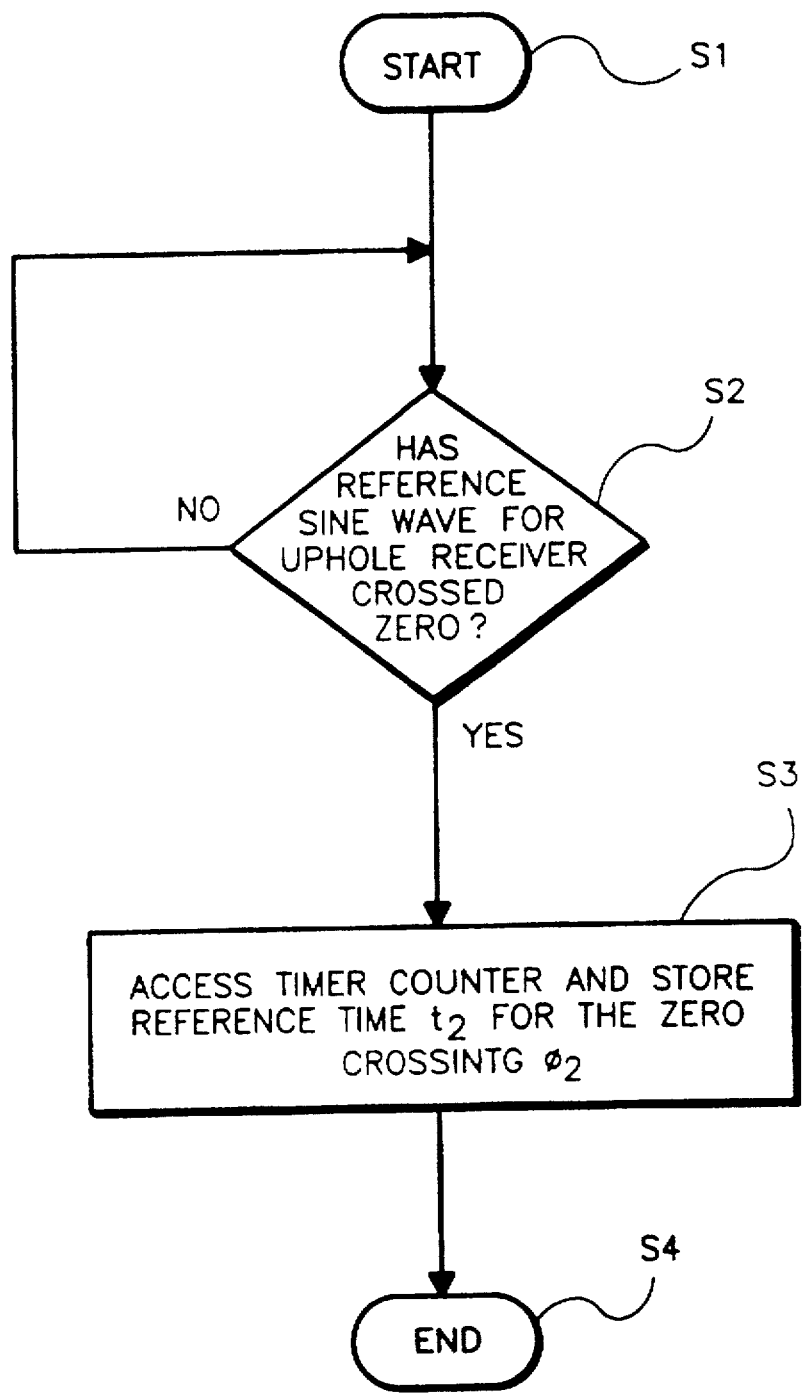
FIG. 13 is a flow chart of processing performed by the processor of the controller of the surface apparatus to determine when a zero-crossing has occurred, to synchronize with the remote apparatus in accordance with the subject invention.

FIG. 13 is a flow chart of processing performed by the processor 33 under control of a control program stored in the memory 34 of in the controller 31. In step S1 of FIG. 13, processing performed by the processor 33 begins. In step S2, the processor 33 determines whether a sine wave reference generated by the wave generator 38 has crossed zero. If not, the processor 33 will perform step S2 of FIG. 13 at a later time. On the other hand, if the processor 33 determines that the sine wave reference has crossed zero in step S2 of FIG. 13, the processor 33 will access the timer counter 36 and store reference time $t_2$ for the zero-crossing $\phi_2$. In step S4 of FIG. 13, processing to determine the reference time $t_2$ for the zero-crossing $\phi_2$ ends.

Figure 14:
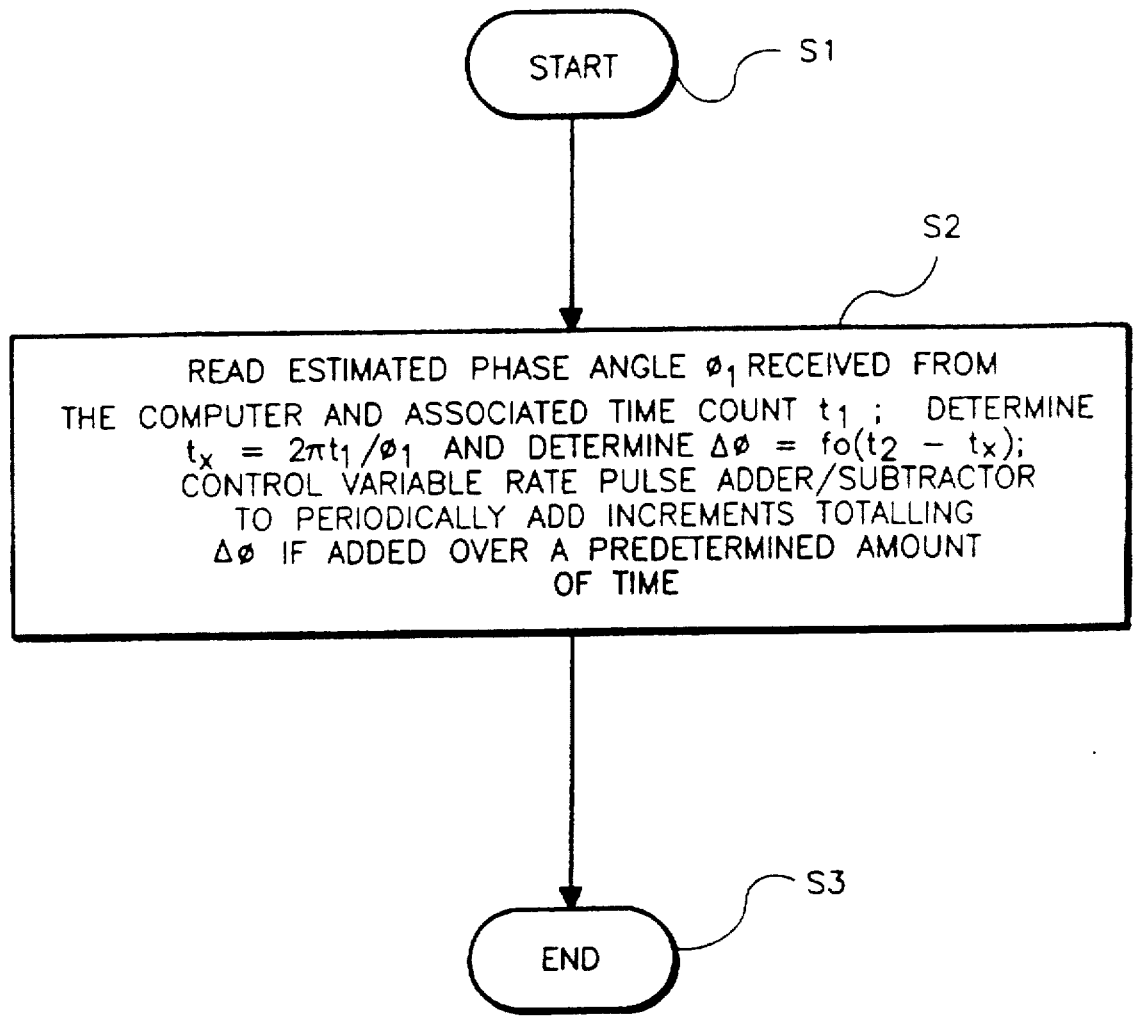
FIG. 14 is a flow chart of processing performed by the processor of the controller for the transmitter unit of the surface apparatus for synchronization with the remote apparatus in accordance with the subject invention.

FIG. 14 is a flow chart of processing performed by the processor 33 under control of a control program stored in the memory 34 of the controller 31. This processing begins in step S1 of FIG. 14. In step S2 of FIG. 14, the processor 33 reads the estimated phase angle $\phi_1$ from the memory 34 along with the associated time count $t_1$. The processor 33 also determines $t_x = 2\pi t_1/\phi_1$ and determines $\Delta\phi = f_0(t_2 - t_x)$. After determining $\Delta\phi$, the controller 31 will control the phase adjuster 36 (i.e., the variable rate pulse adder/subtractor) to periodically add increments totaling $\Delta\phi$ if added over a predetermined amount of time. Preferably, the predetermined amount of time will include more than one cycle of the carrier signal because adding or subtracting increments totaling $\Delta\phi$ at one time tends to have an adverse affect upon synchronizing the phase of the carrier signal generated by the wave generator 38 with the signal $f_c \sin\theta$ used by the demodulator 99 to demodulate the received signal in the remote apparatus 6. In step S3 of FIG. 14, processing to synchronize the carrier signal generated by the wave generator 38 with demodulating signal $f_o \sin\theta$ used in the remote apparatus 6, ends.

3. Data Determination and Decoding

Figure 15:
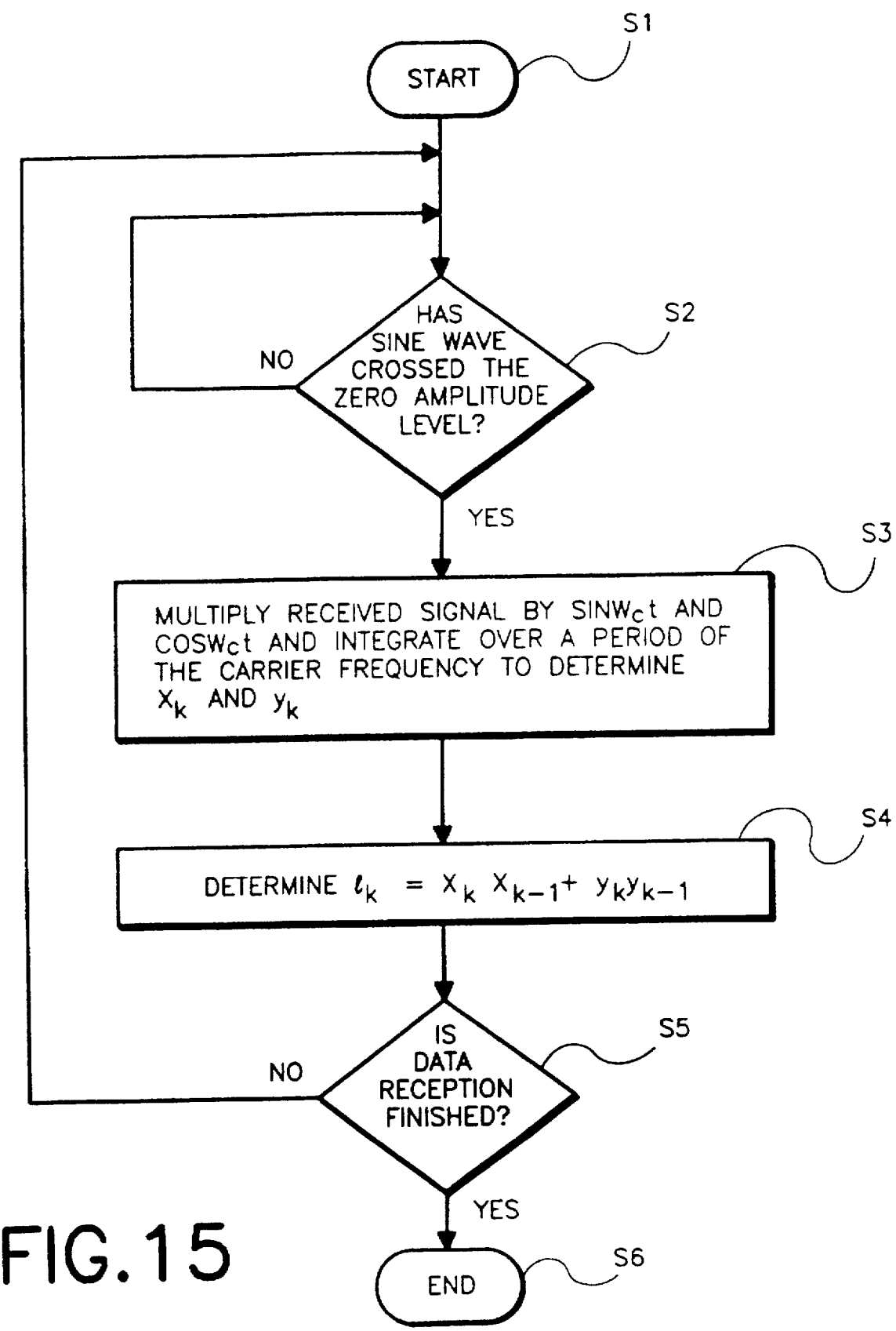
FIG. 15 is a flow chart of processing performed by the digital signal processor of the surface apparatus and/or the receiver unit of the remote apparatus to determine the logic state of a received signal in accordance with the subject invention.

FIG. 15 is a flow chart of processing performed by the digital signal processor 11 of the surface apparatus 7 as well as the receiver unit 71 of the remote apparatus 6. In step S1 of FIG. 15, processing performed by the digital signal processor 11 and the receiver unit 71 begins. In step S2, the digital signal processor 11 or the controller 75 determines whether the sine wave generated by the digital signal processor 11 or the signal $f_o \sin\theta$ has crossed the zero amplitude level in step S2 of FIG. 15. If not, step S2 of FIG. 15 is repeated at a later time. On the other hand, if the digital signal processor 11 or the controller 75 determines that the sine wave has crossed the zero amplitude level, the received signal is multiplied by $\sin\omega_c t$ and $\cos\omega_c t$ and integrated over a modulation period (in the realized embodiment, the modulation period is equal to a period of the carrier frequency) to determine $x_k$ and $y_k$. In step S4 of FIG. 15, the digital signal processor 11 or the controller 75 determines $l_k = x_k x_{k-1} + y_k y_{k-1}$ and in step S5 of FIG. 15, a determination is made establish whether data reception is finished. Essentially, step S5 of FIG. 15 is a determination to establish whether the received input is noise or signal. If data reception is finished as indicated by the lack of a signal for a predetermined time, processing performed by the digital signal processor 11 or controller 75 ends in step S6 of FIG. 15. On the other hand, if the digital signal processor 11 or the controller 75 are still receiving a signal, processing proceeds to step S2 of FIG. 15 to determine the next bit.

Figure 16:
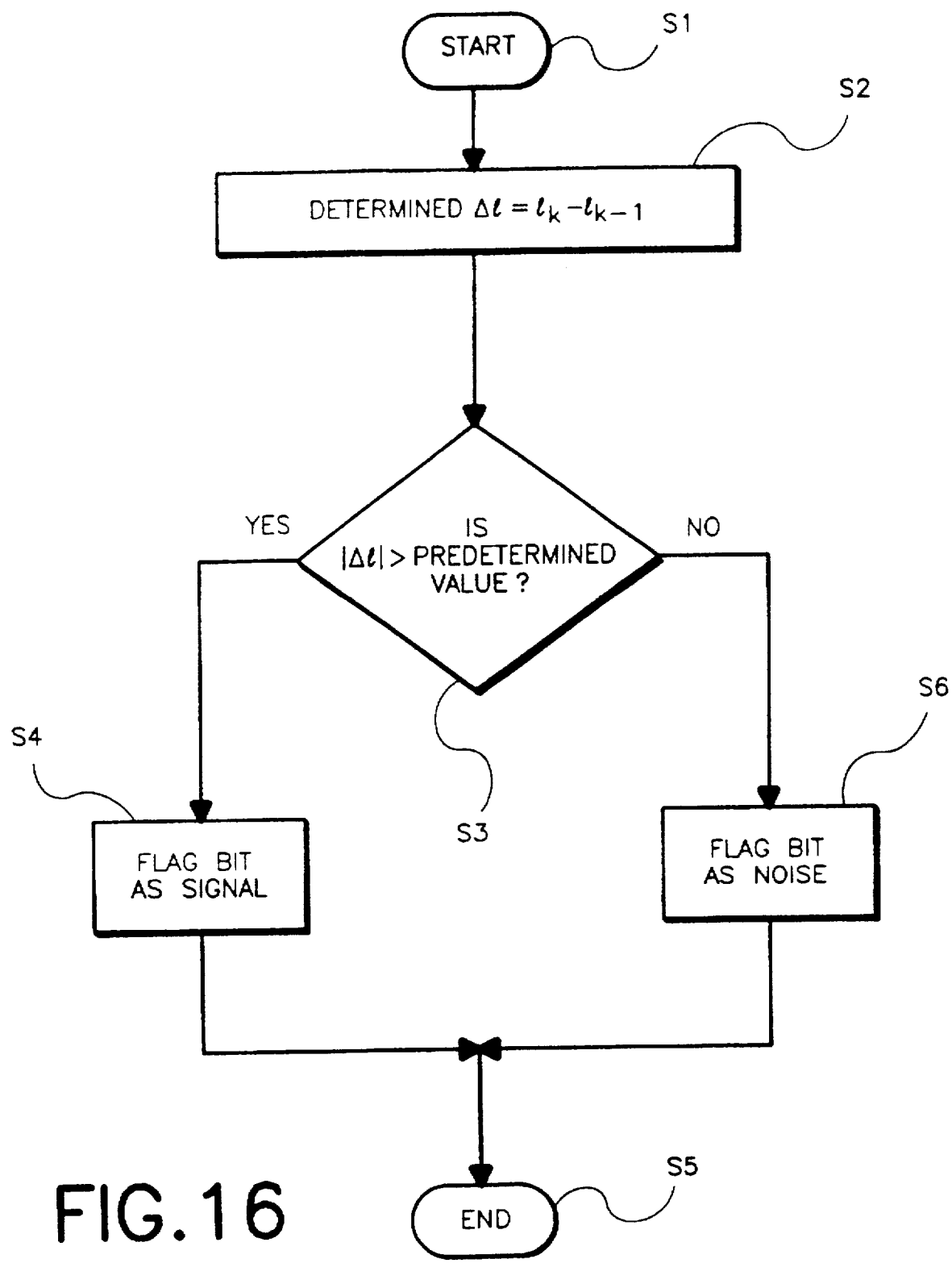
FIG. 16 is a flow chart of processing performed by the digital signal processor of the surface apparatus and/or the receiver unit of the remote apparatus to determine whether a received input is signal or noise in accordance with the subject invention.

FIG. 16 is a flow chart of processing performed by the digital signal processor 11 and/or the receiver unit 71. In step S1 of FIG. 16, processing performed by the digital signal processor 11 or the receiver unit 71 begins. In step S2, the digital signal processor 11 or the controller 75 determines $\Delta l = l_k - l_{k-1}$. In step S3, the digital signal processor 11 or the controller 75 determines whether the absolute value of $\Delta l$ is greater than a predetermined value. If so, the bit $l_k$ is flagged as signal in step S4 of FIG. 16 and processing ends in step S5 of FIG. 16. On the other hand, if the absolute value of $\Delta l$ is not greater than the predetermined value, the bit $l_k$ is flagged as noise in step S6 of FIG. 16, and processing ends in step S5.

Figure 17:
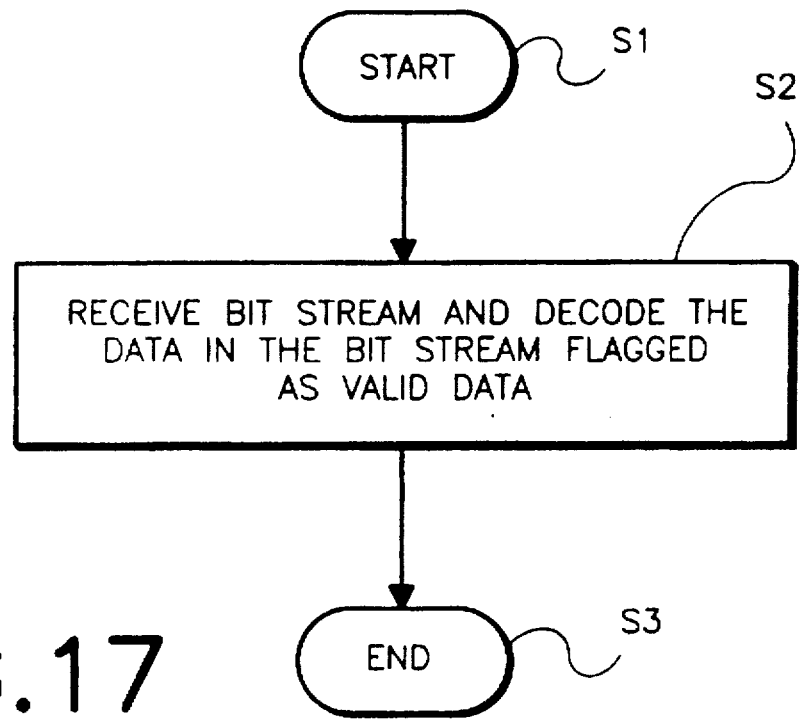
FIG. 17 is a flow chart of processing performed by the processor of the computer in the surface apparatus or by the controller of the receiver unit to decode data in accordance with the subject invention.

FIG. 17 is a flow chart of processing performed by the processor 25 of the computer 12 in the surface apparatus 7, or by the controller 75 of the receiver unit 71. In step S1 of FIG. 17, the processing begins. In step S2, the processor 25 or the processor 78 of the controller 75 receives a bit stream and decodes the data in the bit stream that are flagged as valid data as opposed to being flagged as noise. Because differential phase-shift keying (DPSK) preferred in the subject invention, the following table illustrates the decoding of a received sequence of bits.

TABLE 1

| Received sequence: | 00π0000π0π |
|---|---|
| Encoded sequence: | 0010000101 |
| Decoded sequence: | 100111000 |

The form of encoding/decoding is in Table 1 known as DPSK. Basically, if the preceding bit is the same as an examined bit, a logic zero has been transmitted. On the other hand, if the preceding bit is different than the examined bit, a one has been transmitted. Thus, this type of encoding/decoding requires the provision of a reference digit (i.e., the first zero in the encoded sequence) as shown in Table 1 to provide a known bit to begin the decoding process. Therefore, in non-continuous data transmission using DPSK, a reference bit must be provided. In continuous data transmission in which a data frame immediately follows the previously transmitted data frame, a reference bit is not needed because the last bit of the data frame effectively serves as a reference bit. In step S3 of FIG. 17 processing to decode data bits performed by the computer 12 or the controller 75, ends.

4. Data Encoding

Figure 18:
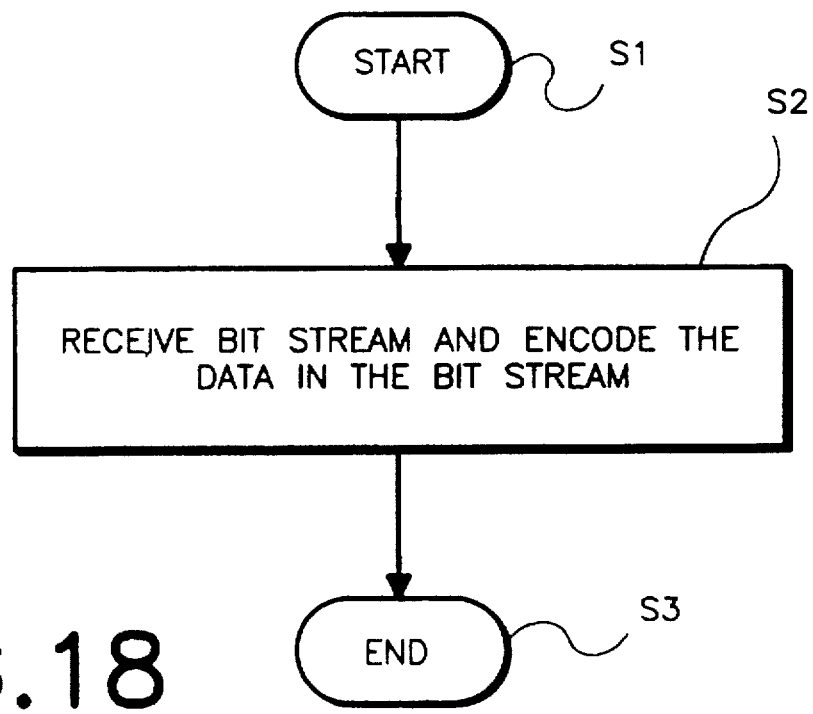
FIG. 18 is a flow chart of processing performed by the processor of the computer of the surface apparatus or the processor of the controller of the remote apparatus to encode data for transmission.

FIG. 18 is a flow chart of processing performed by both the processor 25 of the computer 12 or the processor 78 of the controller 75 to encode data for transmission. In step S1 of FIG. 18, this processing begins. In step S2, the received bit stream is encoded using differential phase-shift keying (DPSK), for example. This encoding is readily understood by examination of Table 1 and the description corresponding to FIG. 17. Specifically, a reference bit is provided if non-continuous data transmission is to be used, and no reference bit is provided if continuous data transmission is to be used. If a logic "1" is to be transmitted, the bit following a particular bit will have the same state as the particular bit. If a logic "0" is to be transmitted, the bit following the particular bit will be different than the particular bit. The process described above is then repeated after shifting one bit, until the entire data frame has been encoded. In step S3 FIG. 18, processing performed by the processor 25 of the computer 12 or the processor 78 of the controller 75, is terminated.

5. Functional States of the Remote Apparatus

Figure 19:
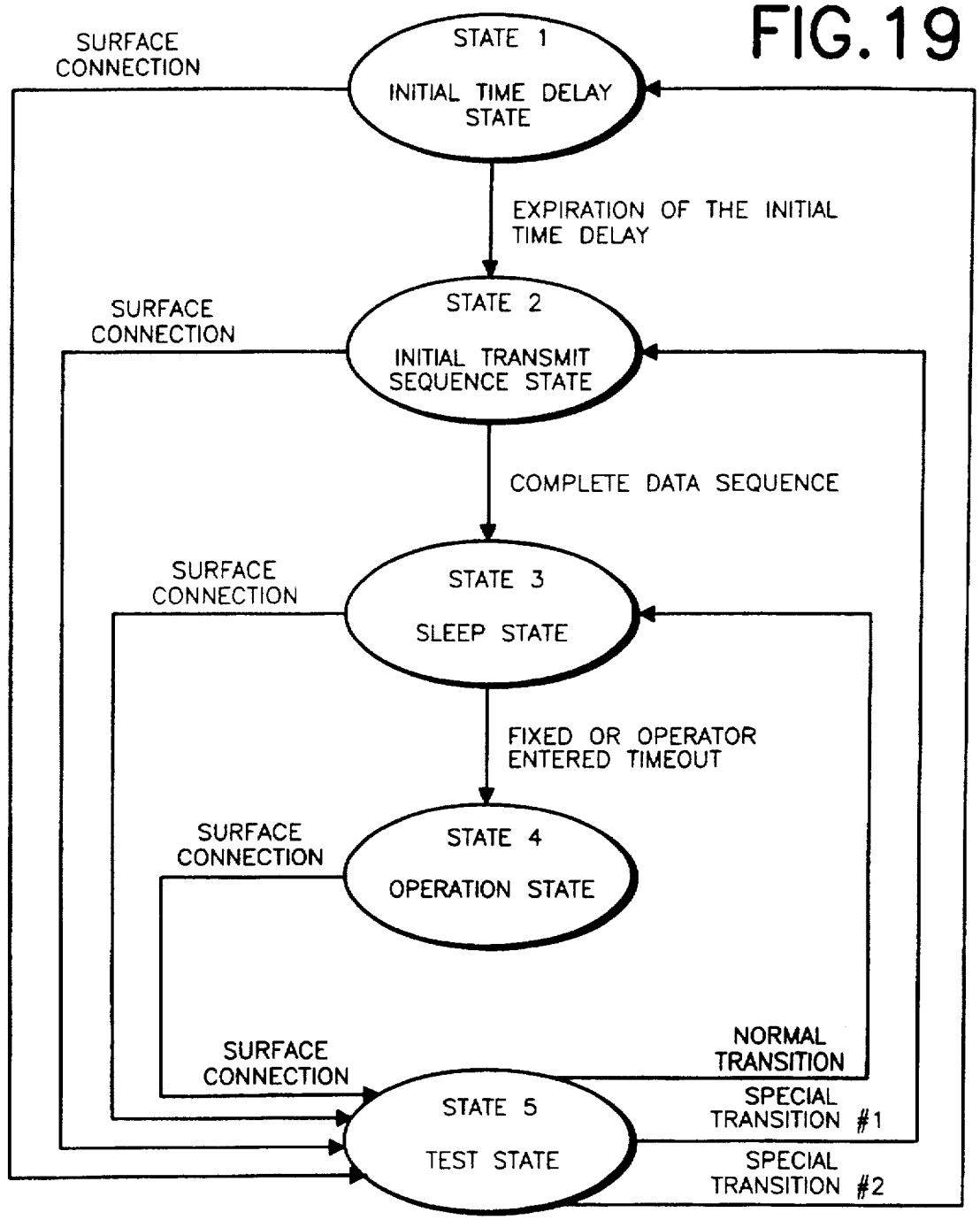
FIG. 19 is a state diagram of functional states of the remote apparatus in accordance with the subject invention.

FIG. 19 is a state diagram of functional states of the remote apparatus 6 in accordance with the subject invention. The states of FIG. 19 and the transition conditions are programmed into the memory 79 and performed by the processor 78 by sequencing through the memory 79. In step S1, the controller 75 idles until expiration a predetermined initial time delay. This initial time delay is a value set in the wake-up delay counter 100 and periodically decremented (or incremented if desired) until the counter 100 reaches a predetermined value corresponding to the initial time delay. The controller 75 periodically determines whether the wake-up delay counter 100 has counted to the predetermined value corresponding to the initial time delay, and the controller 75 will transition to state 2 if the expiration of the initial time delay has occurred. Otherwise, the controller 75 will continue to idle and check the wake-up delay counter 100 periodically for the expiration of the initial time delay.

In state S2, the controller 75 activates the transmitter 86 and transmits fixed known sequences to verify that the sensor/transmitter unit 70 is operating properly. More specifically, the controller 75 transmits fixed known data sequences using the wave generator 80, the modulator 84, the transmitter 86 and the antenna 87, to verify that these elements are operating properly. The controller 75 will also transmit actual pressure and temperature data from the pressure sensor 72 and the temperature sensor 76, to verify that the sensor 72, 76 are operating properly. The controller 75 will also control the switch unit 88 to receive data using the receiver unit 71 to verify its proper operation.

After completion of transmission and reception of data sequences in state S2, the controller 75 will transition to state 3. In state 3, the controller 75 deactivates the transmitter 86 so that the remote apparatus 6 is in a low power consumption mode. The controller 75 sets wake-up delay count data in and monitors the wake-up delay counter 100 until the expiration of a predetermined time period. This time period allows the operator sufficient time to position the remote apparatus 6 at a remote location. For example, this time period can allow sufficient time to slide the remote apparatus 6 to a particular depth in a well bore. Typically, state 3 will last for several hours although other time durations for the sleep state 3 can be set by an operator.

After expiration of the state 3 of FIG. 19, the remote apparatus 6 enters the operation state in state 4 of FIG. 19. In state 4, the remote apparatus 6 will transmit pressure and/or temperature data in frames. For example, these data frames can be formed in a frame built according to format 1, 10 or 20 (discussed in a later section) although other frame formats could be used. In the usual situation, state 4 of FIG. 19 will continue until the battery power for the remote apparatus 6 runs out. However, any of states 1–4 can transition to state 5 upon the connection of a test device (for example, the surface apparatus 7 can be programmed to perform testing of the remote apparatus 6) to the RS232 port of the remote apparatus 6.

In state 5 of FIG. 19, an operator can test the remote apparatus 6 by turning the transmitter 86 on and off, and/or by specifying modulation and data sequences to verify the operation of the transmitter 86. Also, the operator can monitor the pressure and temperature sensors 72, 76. The normal exit from state 5 will be the sleep state in state 3 of FIG. 19. However, the operator can specify a special transition #1 to state 2 or a special transition #2 to state 1.

In an alternative embodiment to that described in FIG. 19, the testing device (preferably the surface apparatus 7 is the testing device) can transmit control data to cause the remote apparatus 6 to transition between the states. In this situation, the surface apparatus 7 can perform the testing of transition conditions to determine whether the remote apparatus 6 should transition between states.

Figure 20:
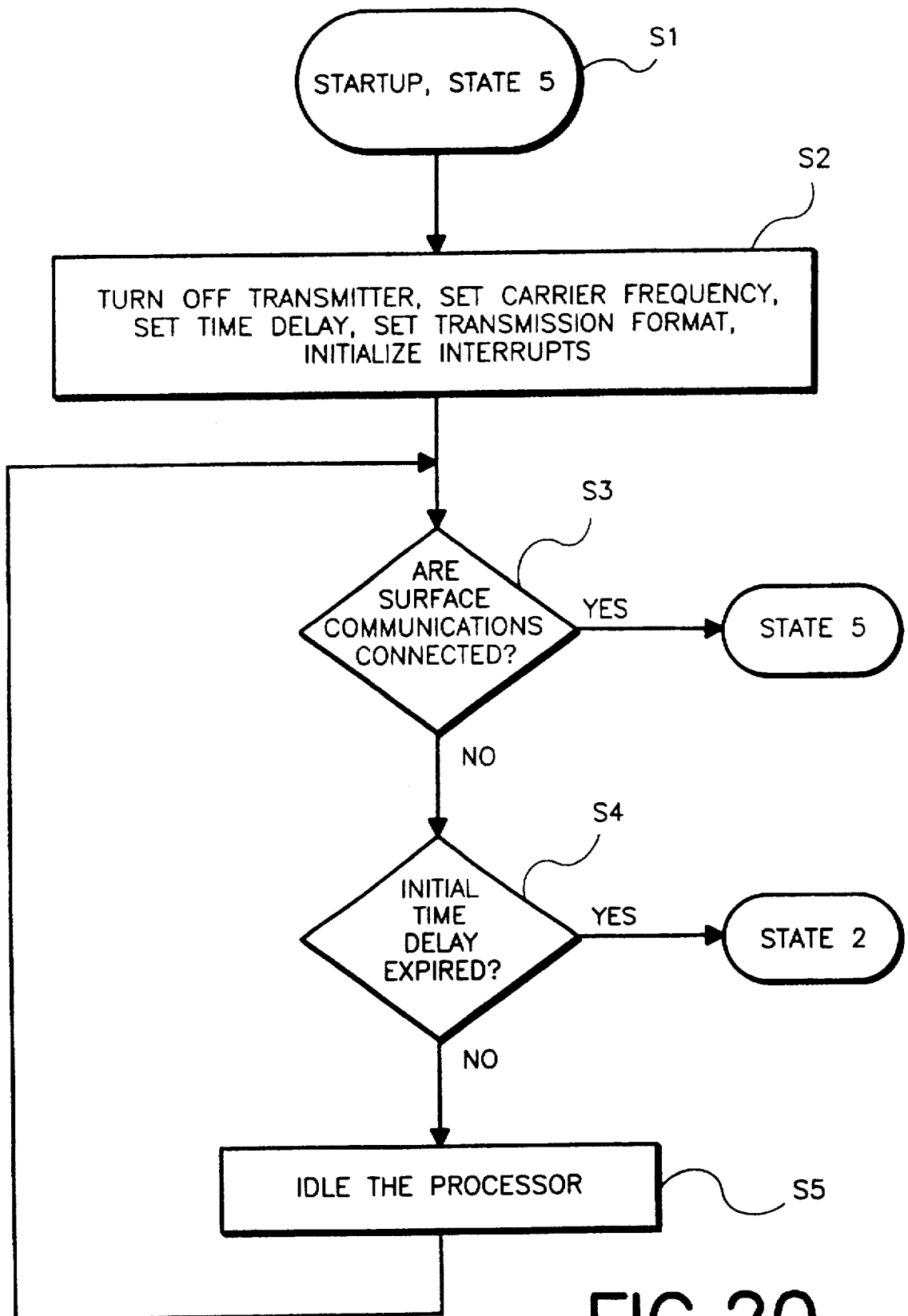
FIG. 20 is a flow chart of processing performed by the controller of the remote apparatus in the initial time delay state of FIG. 19.

FIG. 20 is a flow chart of processing performed by the controller 75 in state 1 of FIG. 19. In step S1 of FIG. 20, processing begins either upon start up of the system or upon transition from state 5. In step S2 of FIG. 20, the transmitter 86 is turned off and a carrier frequency indicated by an operator and stored in the memory 79, is set in the wave generator 80 by providing data to the wave generator 80 on the bus 74. Also, the controller 75 sets a time delay in the wake-up delay counter 100, sets up a transmission format specified by the operator in the memory 79, and initializes interrupts for the processing performed by the remote apparatus 6. In step S3, a decision is made to determine whether surface communications have been initiated through connection of a testing device (preferably, the surface apparatus 7 is programmed to perform the functions of the testing device). If so, the controller 75 transitions to state 5. However, if the determination in step S3 is negative, processing continues to step S4. In step S4 FIG. 20, the controller 75 determines whether initial time delay set in the wake-up delay counter 100, has expired. If so, the controller 75 transitions to state 2 of FIG. 19. On the other hand, if the determination in step S4 determines that the initial time delay has not expired, the controller 75 idles in step S5 for a predetermined amount of time and step S3 is again performed.

Figure 21:
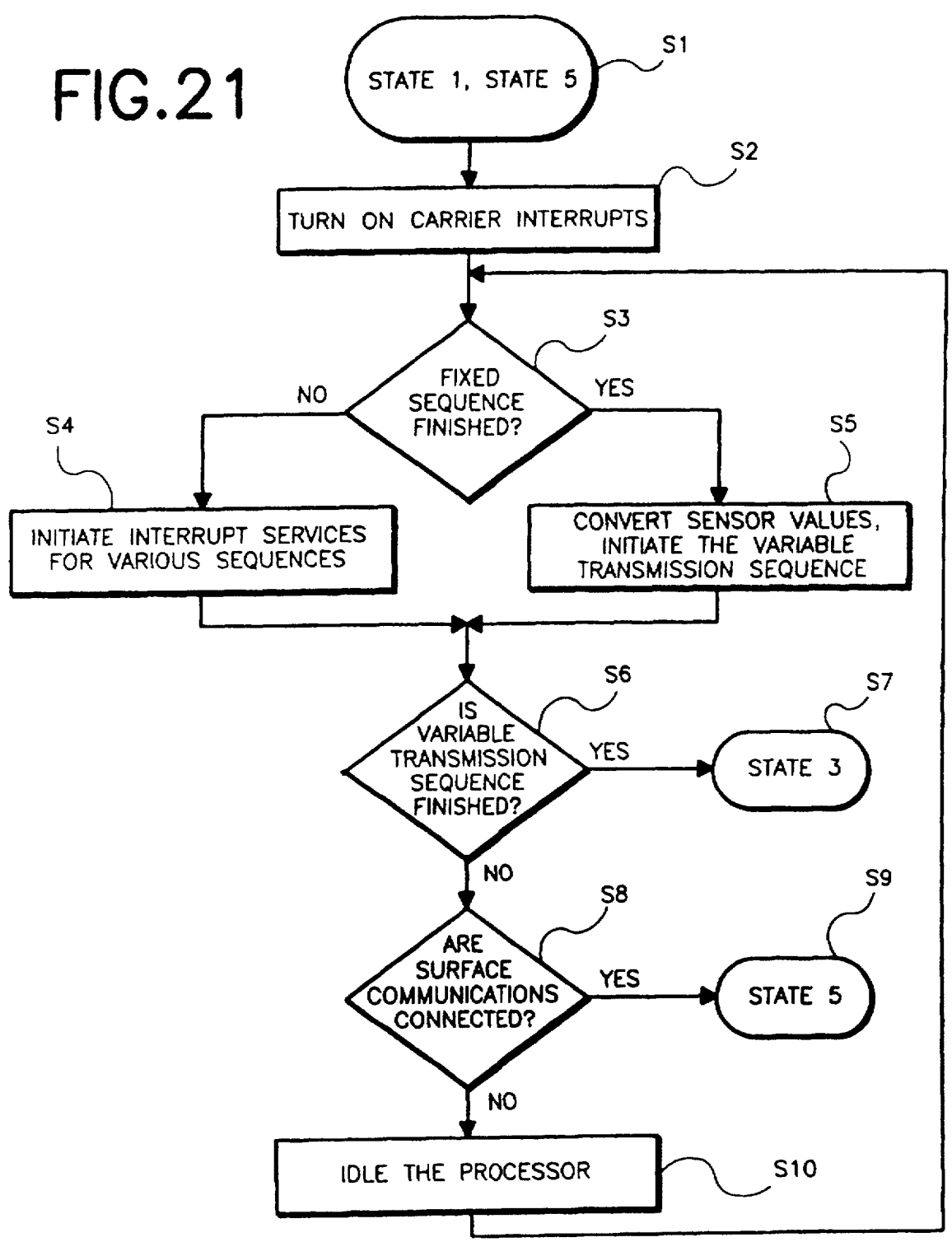
FIG. 21 is a diagram of processing performed by the controller of the remote apparatus in the initial transmit sequence state of FIG. 19.

FIG. 21 is a diagram of processing performed by the controller 75. In step S1 of FIG. 21, processing transitions to state 2 from either state 1 or state 5. In step S2 of FIG. 21, a carrier interrupt is enabled so that the controller 75 will be interrupted by the wave generator 80 when the carrier signal crosses zero amplitude. In step S3 of FIG. 21, the controller 75 determines whether transmission of all data sequences for state 2 have been completed. If not, the controller 75 will initiate interrupt services for various fixed sequences in step S4. On the other hand, if transmission of the fixed sequences is completed in step S3, the controller 75 will convert values received from the pressure and temperature sensors 72, 76 and initiate a variable transmission sequence in which pressure and/or temperature sensor values are transmitted in a data frame. In step S6 of FIG. 21, the controller 75 determines whether transmission of the variable transmission sequence is finished. If so, the controller 75 transitions out of state S2 into state S3 in step S7. On the other hand, if the variable transmission sequence is not finished, a determination is made in step S8 of FIG. 21 to determine whether surface communications have been connected through the RS232 port of the remote apparatus 6. If so, the controller 75 will transition to state 5 in step S9. On the other hand, if no surface communications have been connected in step S8, the controller 75 will idle its processor 78 for a predetermined time in step S10 and repeat step S3.

Figure 22:
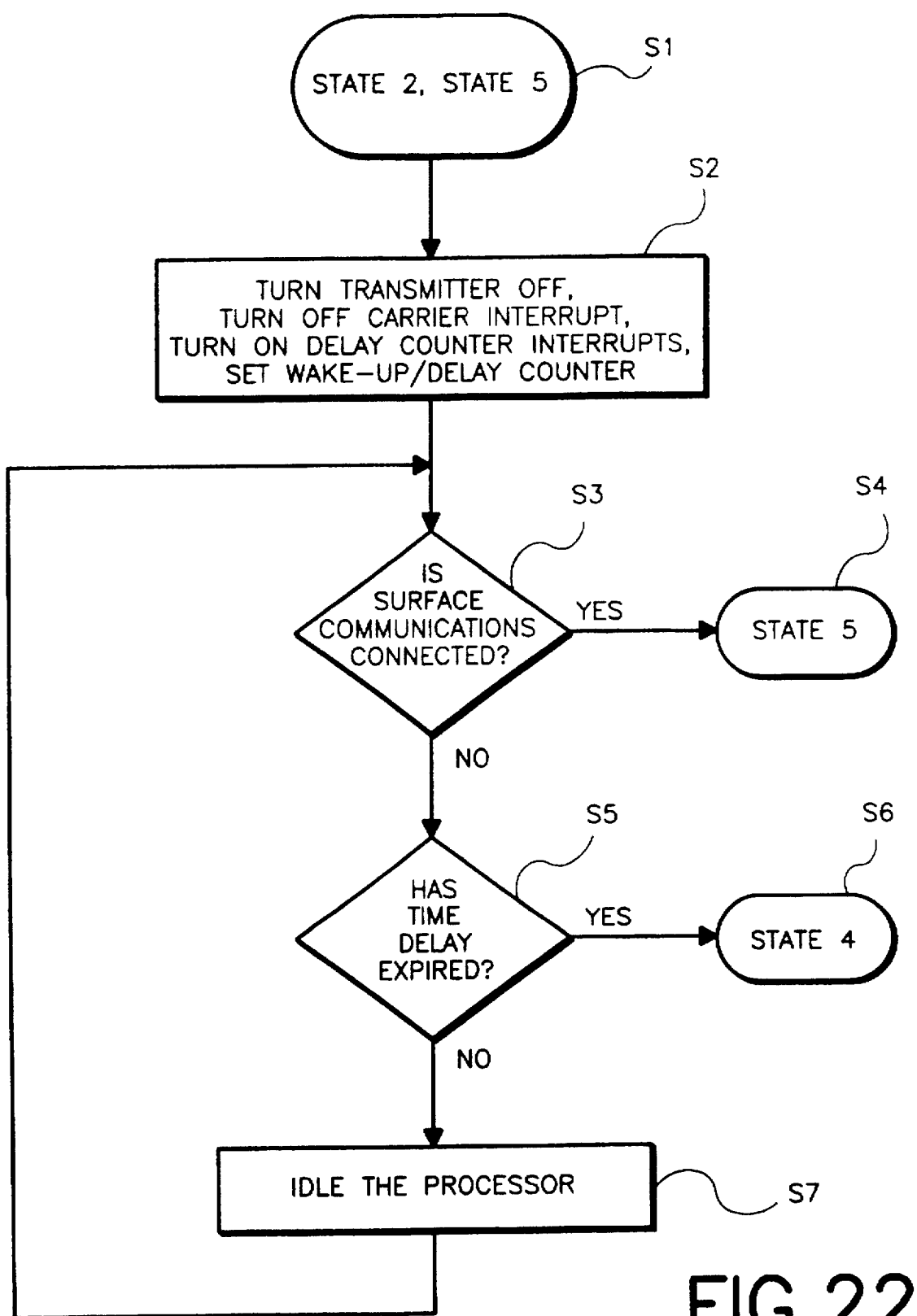
FIG. 22 is a flow chart of processing performed by the controller of the remote apparatus in the sleep state of FIG. 19.

FIG. 22 is a flow chart of processing performed by the controller 75 in state S3 of FIG. 19. In step S1 of FIG. 22, processing for state 4 begins by transitions from either state 2 or state 5. In step S2, the controller 75 turns the transmitter 86 off, and turns off the carrier interrupt so that the controller 75 will not be interrupted when the carrier signal generated by the wave generator 80 crosses zero amplitude. The controller 75 also enables time delay counter interrupts and sets the wake-up/delay counter 100 to a predetermined value. In step S3, a determination is made to establish whether connection to a testing device has been made through the RS232 port of the remote apparatus 6. If so, the controller 75 will transition to state 5 in step S4 of FIG. 22. On the other hand, if no connection has been made to the RS232 port of the remote apparatus 6, processing proceeds to step S5 in which the controller 75 reads the count value from the wake-up delay counter 100 to determine whether the predetermined time has expired. If so, the controller 75 will transition to state 4 in step S6. On the other hand, if the predetermined time delay has not expired, the controller 75 will idle its processor 78 in step S7 of FIG. 22, and repeat step S3.

Figure 23:
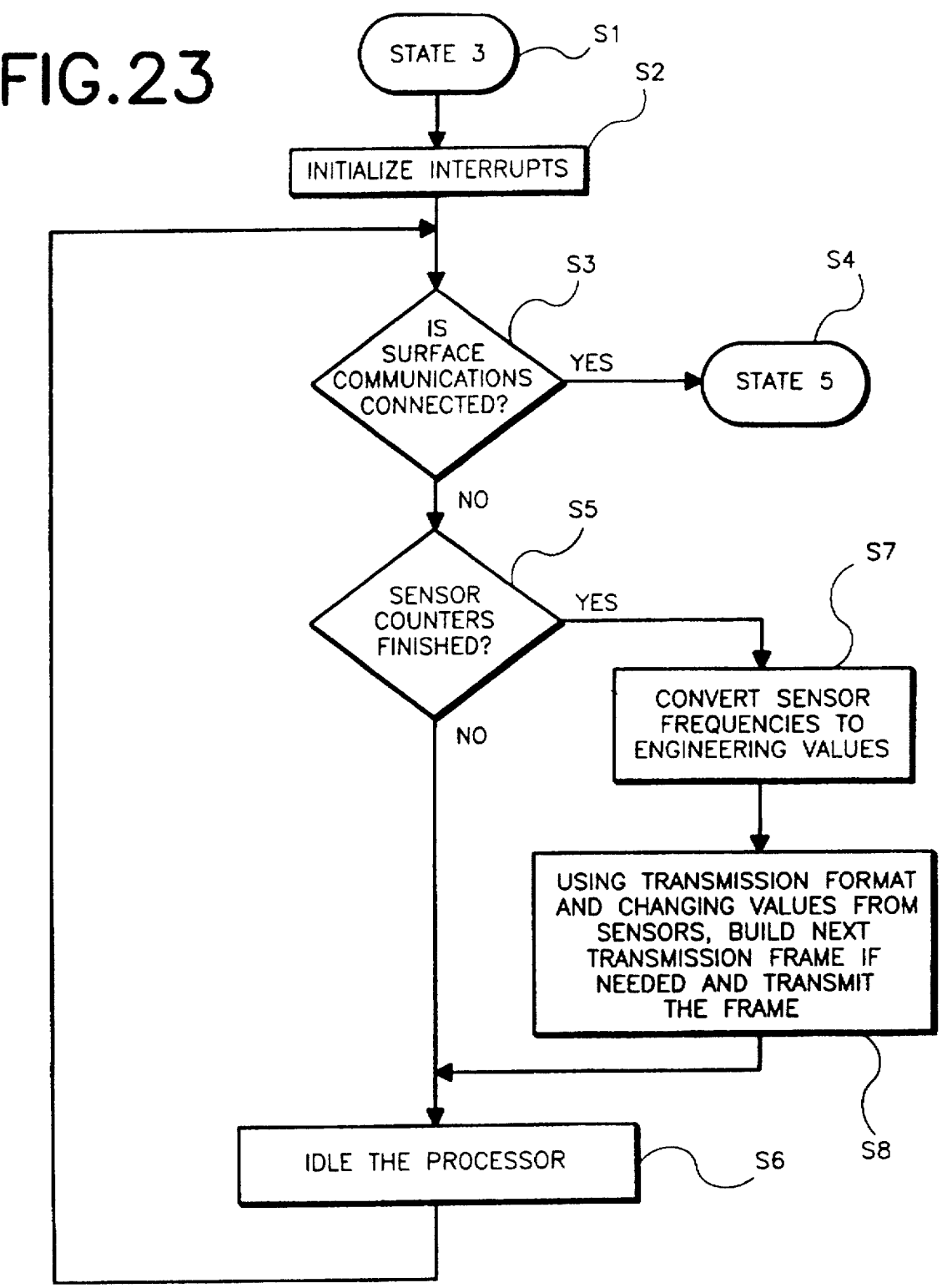
FIG. 23 is a flow chart of processing performed by the controller in the remote apparatus and the operation state of FIG. 19.

FIG. 23 is a flow chart of processing performed by the controller 75 in state S4 of FIG. 19. In step S1 of FIG. 23, processing for state S4 starts after transition from state 3 in step S1. In step S2, the controller 75 initializes interrupts. In step S3, the controller 75 determines whether surface communications have been established by connection of a testing device to RS232 port of the remote apparatus 6. If so, the controller 75 will transition to state 5 in step S4. On the other hand, if surface communications have not been established by connection to the RS232 port of the remote apparatus 6, the controller 75 will determine whether sensor counts counted by the counter 73, 77, have finished for a predetermined time period. If not, the processor 78 of the controller 75 idles in step S6. On the other hand, in step S5 of FIG. 23, if the counter 73, 77 have finished counting for a predetermined time, processing proceeds to step S7 in which the counts obtain by the counters 73 and 77 over the predetermined time period, are converted to engineering values. For the temperature sensor 76, the temperature is a function of the counts stored in the counter 77. The function is a fourth-order polynomial expansion. On the other hand, the pressure sensed by the pressure sensor 72 can be determined as a function of both the pressure counts stored in the counter 73 and temperature counts stored in the temperature counter 77. For example, this function can be a fourth-order two dimensional polynomial. In step S8, the controller 75 uses a transmission format and changing values from the pressure and temperature sensor 72, 76 to build a frame of data for transmission. If the controller 75 is programmed for discontinuous data transmission, the controller 75 waits until the expiration of a predetermined time period before transmitting the data frame. When the controller 75 is to transmit the data frame, the controller 75 will switch on the transmitter 86 so that the transmitter 86 has battery power to perform data transmission. The controller 75 will then control transmission of the data frame and deactivate the transmitter 86. If the controller 75 has been programmed before continuous data transmission, the transmitter 86 will continuously be powered in state S4 under control of the controller 75. Processing performed by the controller 75 then proceeds to step S6 of FIG. 23.

Figure 24:
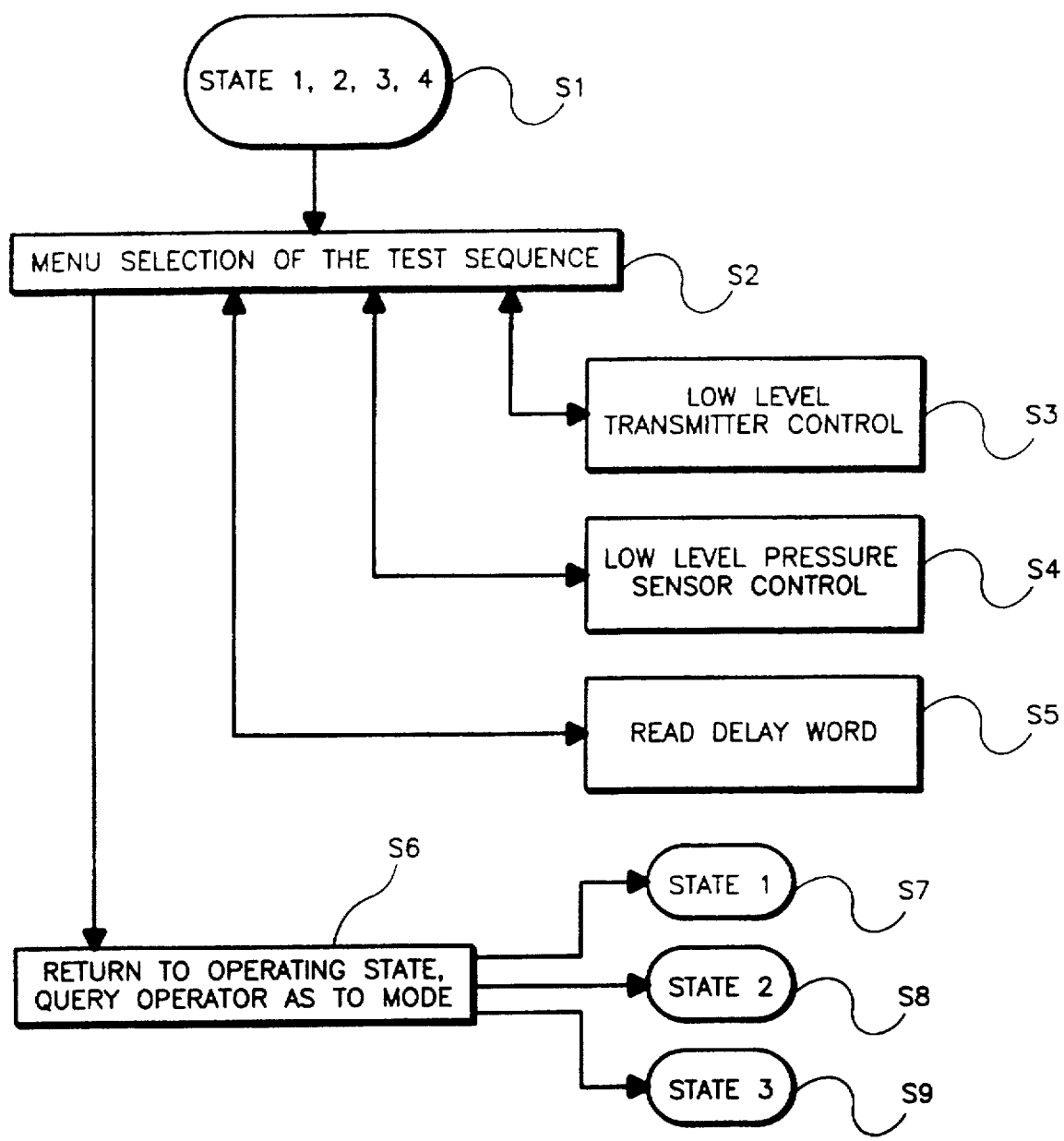
FIG. 24 is a flow chart of processing performed by a testing device and processing performed by the controller of the remote apparatus in the test state of FIG. 19.

FIG. 24 is a flow chart of processing performed by a testing device (for example, surface apparatus 7 can be programmed to perform the functions of testing device) and processing performed by the controller 75. In step S2, a menu is displayed for an operator so that the operator can select a particular testing operation. Specifically, the operator can select the low level transmitter control in step S3 to turn the carrier signal ON or OFF, or to set a desired phase, or low level pressure sensor control in step S4 to test the sensor and provide diagnostic software to test the circuits. Alternatively, the operator can select in step S5 to read a delay word to determine the programmed duration of state 1 or state 3. In step S6, the operator is queried as to the state to be entered by the controller 75. In steps S7–S9, the processing for state S5 ends by transition to states 1–3, respectively, as selected by the operator.

6. Transmission Data Frame Formats

An important aspect of the subject invention is the transmission of change-in-pressure or change-in-temperature data rather than the transmission of absolute pressure and temperature data. By transmitting change-in-pressure and/or change-in-temperature data, the subject invention is able to reduce the number of bits used in a data frame so that the power used in transmission of the data frame is correspondingly reduced. The change-in-pressure and/or change-in-temperature data can be changes in pressure or temperature relative to a past value, or changes in temperature or pressure extrapolated from past pressure or temperature values. In addition to transmitting change-in-pressure and/or change-in-temperature data, the remote apparatus 6 of the subject invention is also capable transmitting absolute pressure and/or temperature data corresponding to the sensed pressure and/or temperature. In the preferred embodiment of the subject invention, there are three formats denoted formats 1, 10 and 20. In formats 1, 10 and 20 as realized, 12 bits of absolute pressure data and 8 bits of absolute temperature data are to be transmitted. The formats 1, 10 and 20 are discussed in more detail below with reference to FIGS. 25A–25G.

Figure 25A:
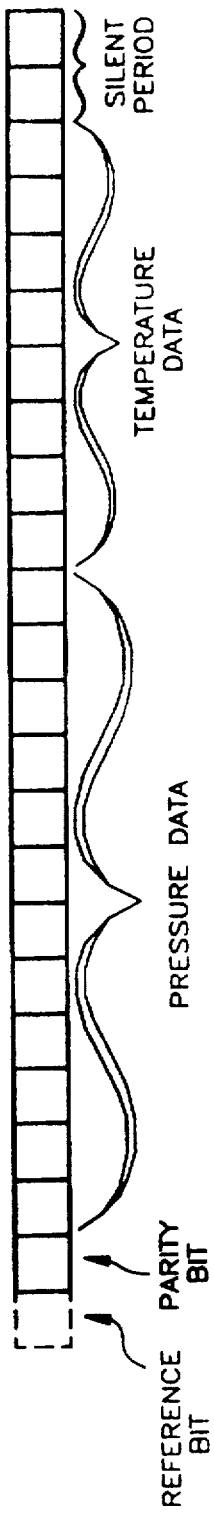
FIG. 25A is a data frame format used in format 1 in accordance with the subject invention.

FIG. 25A is a data frame format used in format 1. In format 1, 12 bits of pressure data and 8 bits of temperature data are transmitted in a frame including a parity bit used to detect errors in transmission of the data frame, and a two-bit silent period provided to synchronize bit decoding to the front of the data frame. In the data frame of FIG. 25A, a reference bit is always included since a silent period is always present. Accordingly, the reference bit is needed to provide a reference for the differential phase-shift keying (DPSK) that is preferred for modulation in the subject invention (in differential phase-shift keying, the logic state of a data bit is determined by establishing whether the examined bit is the same as or different than the immediately preceding bit). If data transmission was occurring before transmission of a given data frame, the reference bit is not needed because a bit reference (i.e., the last bit transmitted in the previous data frame) already exists.

In format 10, ten data frames are built and transmitted by the remote apparatus 6. The first data frame is as shown in FIG. 25B. Here, the absolute pressure data is transmitted as 12 bits in the data frame of FIG. 25B. In addition to the absolute pressure data, a parity bit for detecting transmission errors, is also sent. As previously explained, the data frame of FIG. 25B can include a reference bit depending upon whether continuous or non-continuous data transmission is to be effected.

Figure 25C:
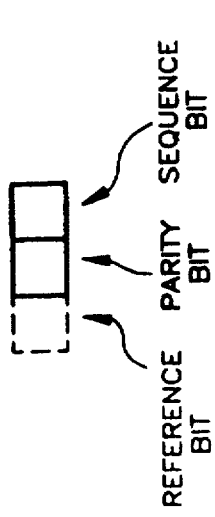

The next four data frames have a format in accordance with the data frames of FIGS. 25C–25F. In FIG. 25C, if no significant temperature change and no significant pressure change has occurred, the remote apparatus 6 will transmit a reference bit depending whether data transmission is continuous or non-continuous, a parity bit for detecting transmission errors, and a sequence bit which is one bit in the eight-bit word for absolute temperature data.

Figure 25D:
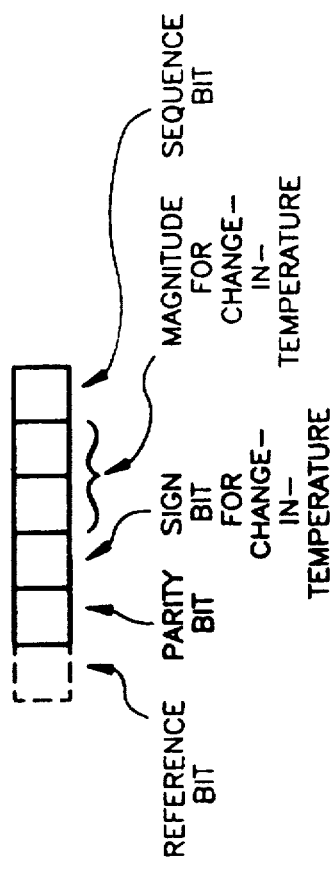

The data frame of FIG. 25D includes a reference bit if data transmission is non-continuous, a parity bit for detecting transmission errors, a sign bit for change-in-temperature data, two bits for the magnitude for the change-in-temperature data and a sequence bit that is one bit in the eight-bit word for absolute temperature data.

Figure 25E:
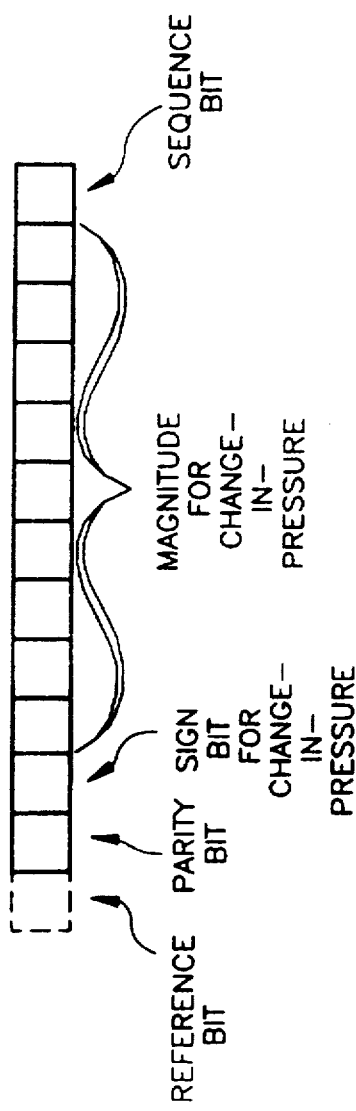

The data frame of FIG. 25E includes a reference bit if data transmission is non-continuous, a parity bit for detecting transmission errors, a sign bit for change-in-pressure data, nine bits for the magnitude of change-in-pressure data and one sequence bit for the eight-bit absolute temperature data word.

Figure 25F:
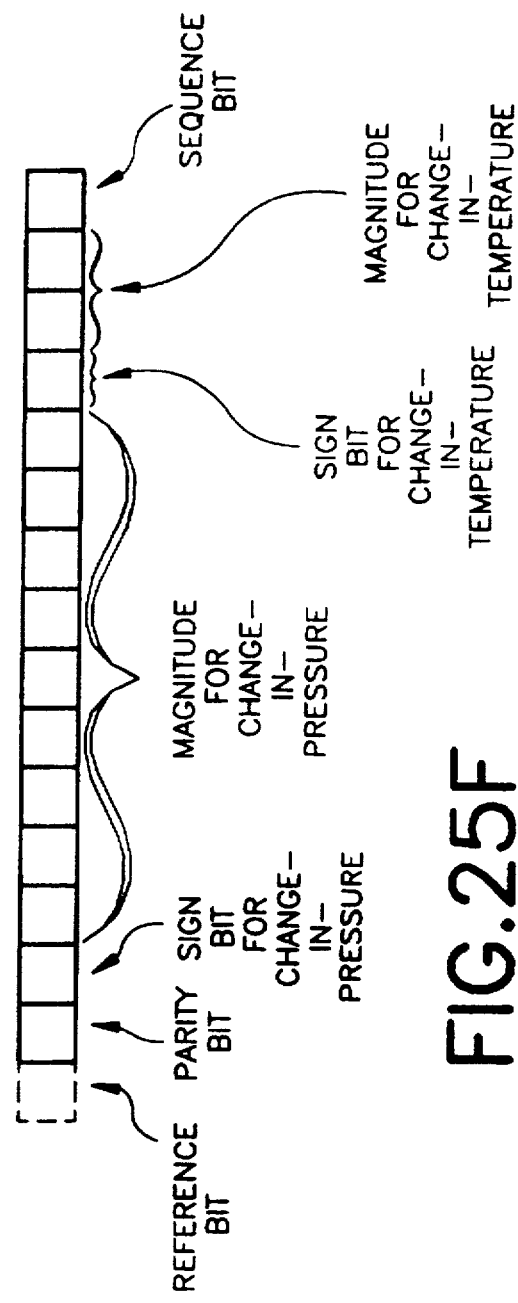

The data frame of FIG. 25F includes a reference bit if data transmission is non-continuous, a parity bit for detection of transmission errors, a sign bit for change-in-pressure data, nine bits for the magnitude of change-in-pressure data, a sign bit for change-in-temperature data, two bits for the magnitude of the change-in-temperature data, and one sequence bit for the eight-bit absolute temperature data word.

In format 10, the sixth frame is shown in FIG. 25G and includes a reference bit if data transmission is non-continuous, a parity bit for detection of transmission errors, absolute press of absolute pressure data and a fixed sequence of two bits to distinguish the sixth frame from the first frame shown in FIG. 25.

In format 10, a new data format was chosen to enable quicker recovery from data errors. The absolute pressure is sent every 5 frames allowing error recovery for pressure in 5 frames, and the block length is 10 frames, allowing recovery of temperature errors in from 10 to 20 frame periods.

In format 10, a new data format was chosen to enable quicker recovery from data errors. The absolute pressure is sent every 5 frames allowing error recovery for pressure in 5 frames, and the block length is 10 frames, allowing recovery of temperature errors in from 10 to 20 frame periods.

Format 20 includes twenty data frames as shown in FIGS. 25C–25F because there are 12 bits of absolute pressure data and 8 bits of absolute temperature data, a total of 20 data frames are transmitted for transmission of one absolute pressure data word and one absolute temperature data word as sequences of bits in the data frames of FIGS. 25C–25F. Error recovery takes 20–40 frames of data.

Figure 26:
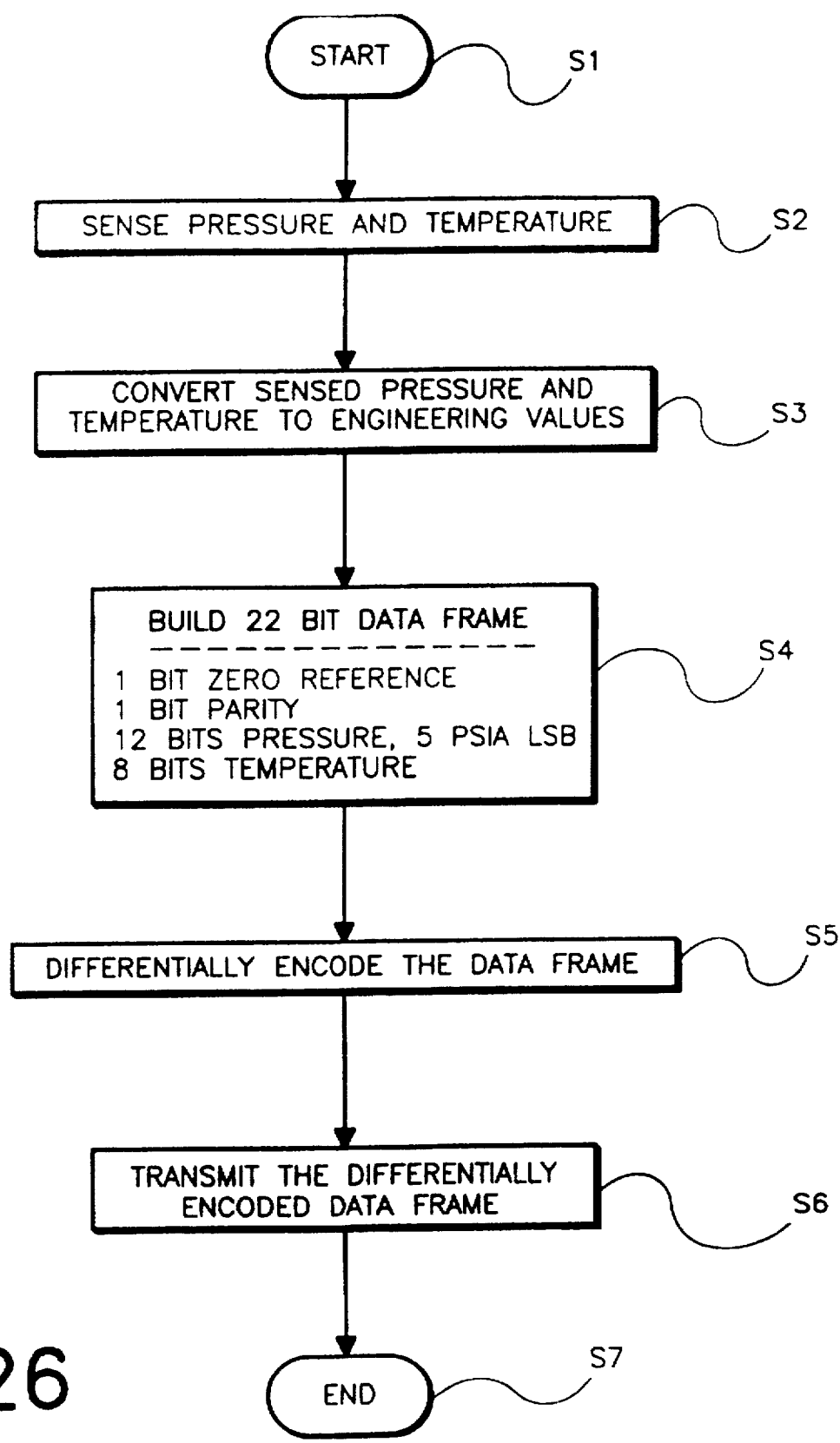
FIG. 26 is a flow chart of processing performed by the sensor/transmitter unit of the remote apparatus in format 1 in accordance with the subject invention.

FIG. 26 is a flow chart of processing performed by the sensor/transmitter unit 70 in format 1. In step S1 of FIG. 26, processing for format 1 begins. In step S2, pressure and temperature are sensed by the pressure sensor 72 and temperature sensor 76, respectively, whose inputs are provided to respective counters 73, 77. In step S3, the pressure count data stored in the counter 73 and the temperature count data stored in the counter 77 are converted to engineering values by the processor 78 under control of a control program stored in the memory 79. In step S4 of FIG. 26, the processor 78 under control of a control program stored in the memory 79, builds the twenty-two-bit data frame of FIG. 25A. In step S5, the processor 78 under control of a control program stored in the memory 79, differentially encodes the data frame built in step S4. In step S6 of FIG. 26, the differentially-encoded data frame is transmitted using the wave generator 80, the phase shifter 84, the transmitter 86 and the antenna 87 as controlled by the processor 78 under control of a control program stored in the memory 79. The processing performed by the sensor/transmitter unit 70 in format 1 ends in step S7 of FIG. 26.

Figure 27:
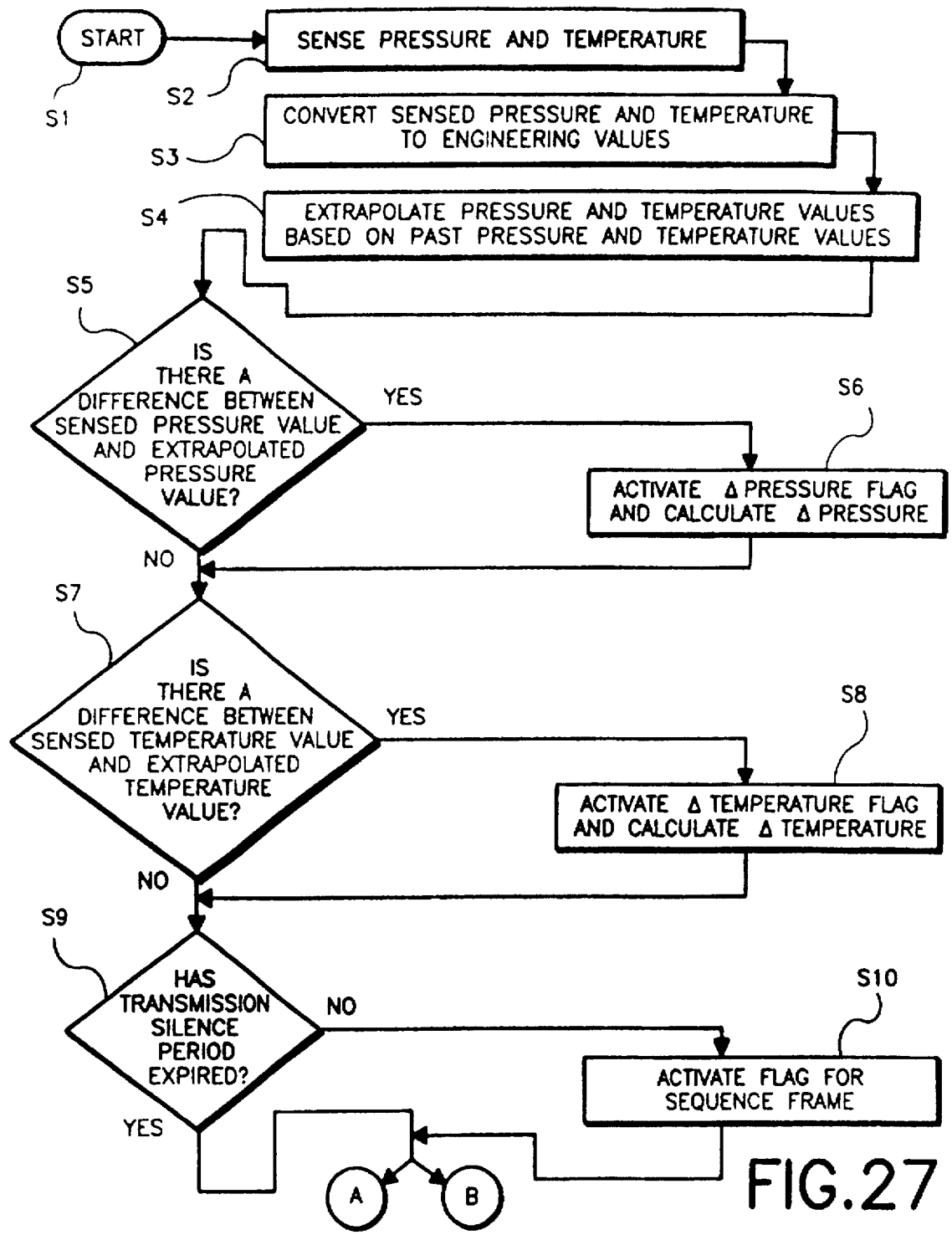
FIG. 27 is a flow chart of processing performed by the sensor/transmitter unit for both formats 10 and 20 in accordance with the subject invention.

FIG. 27 is a flow chart of processing that is performed by the sensor/transmitter unit 70 for both formats 10 and 20. In step S1 of FIG. 27, processing for the sensor/transmitter unit 70 in formats 10/20 begins at a reference time. In step S2, the pressure sensor 72 senses pressure and generates an input to the counter 73. The temperature sensor 76 senses temperature and generates an input provided to the counter 77. In step S3 of FIG. 27, the processor 78 under control of a control program stored in the memory 79 converts the sensed pressure and temperature count values from the counter 73, 77 to engineering values. In step S4 of FIG. 27, the processor 78 under control of a control program stored in the memory 79, extrapolates pressure and temperature values based on past pressure and temperature values stored in the memory 79. For example, the extrapolation performed by the processor 78 can be a linear extrapolation based on past pressure and/or temperature values. Step S4 of FIG. 27 can be omitted if change-in-pressure and change-in-temperature data is to be relative to past pressure and temperature values (for example, the immediately past pressure and temperature values) stored in the memory 79. In step S5 of FIG. 27, the processor 78 under control of the control program stored in the memory 79 determines whether there is any difference between the sensed pressure value and extrapolated pressure value or a previous pressure value. If so, the processor 78 activates a Δ pressure flag in step S6 of FIG. 27, and calculates change-in-pressure data. Processing then proceeds to step S7. On the other hand, if the determination in step S5 determines that there is no difference between the sensed pressure value and the extrapolated pressure value or the previous pressure value, processing proceeds to step S7 of FIG. 27. In step S7, the processor 78 under control of a control program stored in the memory 79 determines whether there is a difference between the temperature value and extrapolated temperature value or a previous temperature value. If so, processing proceeds to step S8 in which the processor 78 activates a change-in-temperature flag and calculates the change-in-temperature data. Processing then proceeds to step S9. On the other hand, if the determination in step S7 establishes that there is no difference between the sensed temperature value and extrapolated temperature value or previous temperature value, processing proceeds to step S9 of FIG. 27. In step S9, the processor 78 under the control of the control programs stored in the memory 79, determines whether a transmission silence period has expired. If so, the processor 78 will activate a flag for a sequence frame so that a data frame will be built for transmission.

Figure 28:
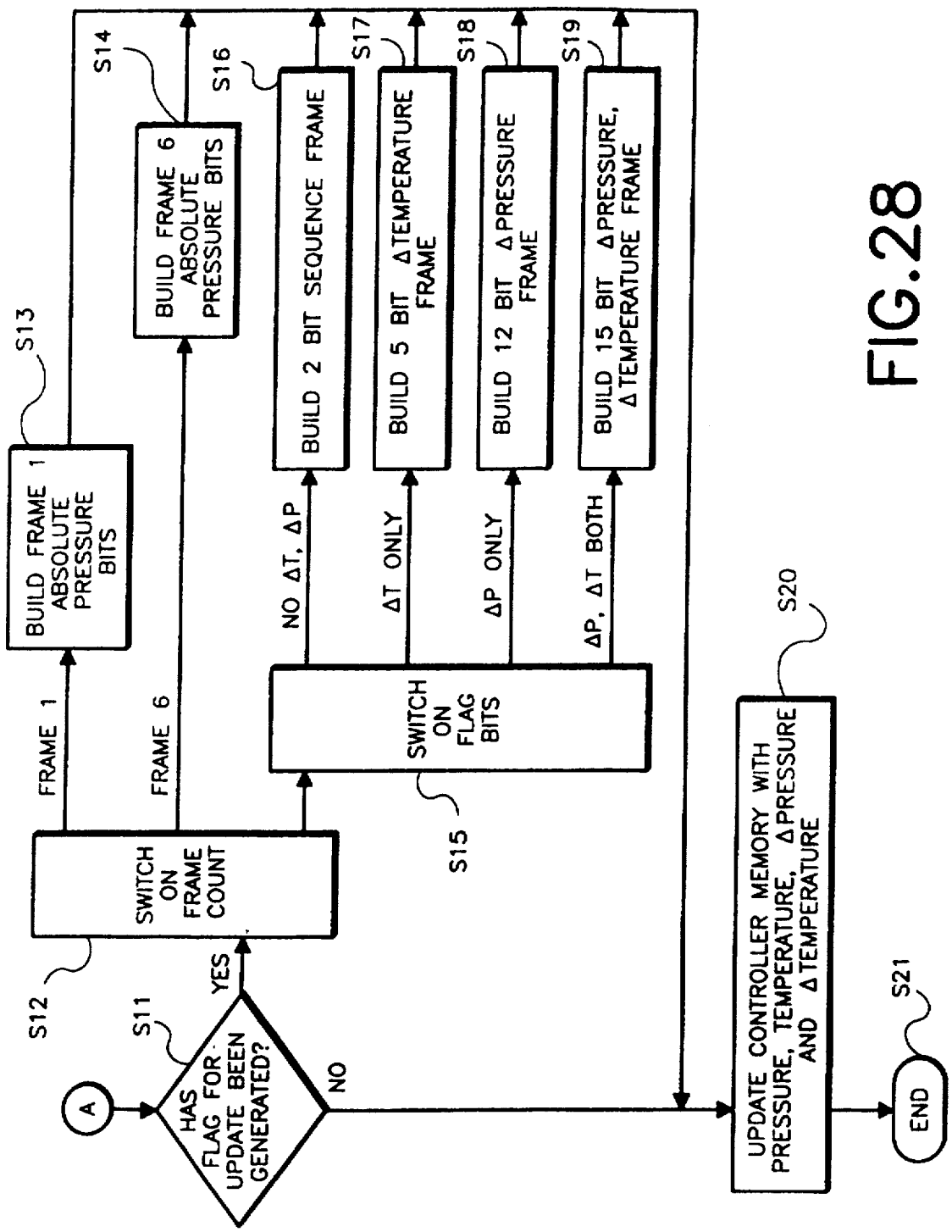
FIG. 28 is a flow chart of processing performed by the sensor/transmitter unit for format 10 in accordance with the subject invention.

From step S9 or step S10 of FIG. 27, processing proceeds to (A) if format 10 is to be used, and (B) if format 20 is used. In FIG. 28, processing performed by the sensor/transmitter unit 70 for format 10 proceeds with a determination in step S11 of FIG. 28. The processor 78 determines whether a flag for an update has been generated, and if not, processing proceeds to step S12. On the other hand, if a flag for an update and transmission of pressure and temperature data has been generated, the processor 78 will refer to its memory 79 to determine the frame count in step S12. If the frame is the first frame to be transmitted in the series of frames for format 10, the processor 78 under control of the control program stored in the memory 79 will build one frame including absolute pressure bits as shown in FIG. 25B in step S13 of FIG. 28. If the processor 78 determines that the frame count is for frame 6 of format 10, the processor 78 in conjunction with the memory 79 will build frame 6 including absolute pressure bits as shown in FIG. 25G. If the processor 78 determines that the frame count is other than frame 1 or frame 6 in step S12 of FIG. 28, processing proceeds to step S15 in which the processor 78 observes the flag bits to determine whether any of the change-in-temperature or change-in-pressure flags have been set. If no change-in-temperature or change-in-pressure bit has been set, the processor 78 in conjunction with the memory 79 will build the data frame of FIG. 25C in step S16 of FIG. 28. If only a change-in-temperature flag is set, the processor 78 in conjunction with the memory 79 will build the data frame of FIG. 25D in step S17 of FIG. 28. If only the change-in-pressure flag is set, the processor 78 in conjunction with the memory 79 will build the data frame of FIG. 25E in step S18 in FIG. 28. Lastly, if both the change-in-pressure flag and the change-in-temperature flag are set, the processor 78 in conjunction with the memory 79 will build the data frame of FIG. 25F in step S19 of FIG. 28. After one of the data frames is built in steps S16–S19 of FIG. 28, the processor 78 will update its controller memory 79 with pressure, temperature, change-in-pressure and change-in-temperature data in step S12 of FIG. 28, the processor 78 terminates the processing performed by the sensor/transmitter unit 70 in step S20 of FIG. 28.

Figure 29:
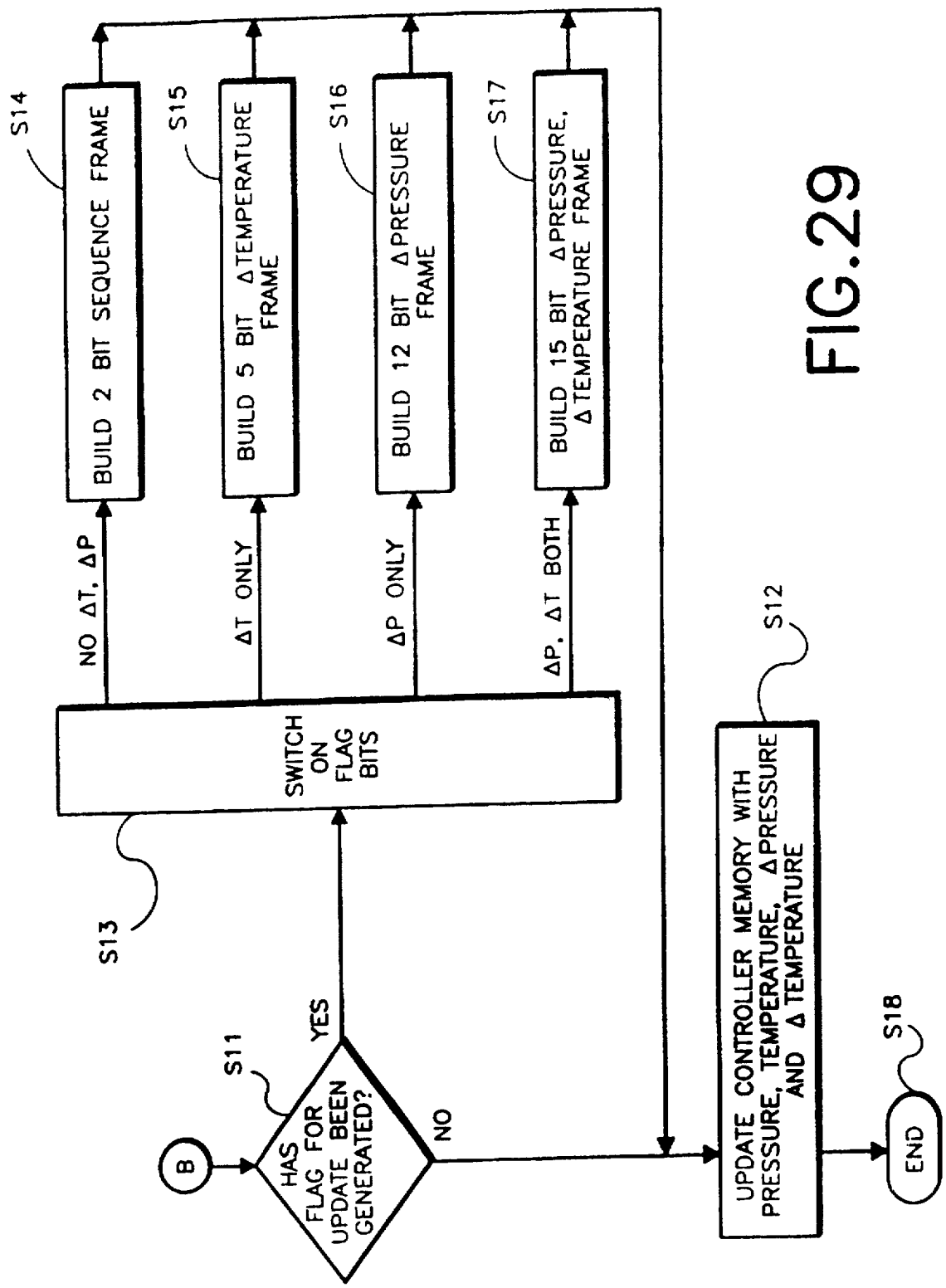
FIG. 29 is a flow chart of processing performed by the sensor/transmitter unit of the remote apparatus in format 20 in accordance with the subject invention.

In format 20, processing in steps S9 or step S10 of FIG. 27 will proceed to (B). In FIG. 29, the processing performed by the processor 78 in conjunction with the memory 79 for format 20 continues. In step S11 of FIG. 29, the processor 78 determines whether the flag for an update has been generated. If not, processing proceeds to step S12 of FIG. 29. On the other hand, if the flag for an update has been generated in step S11, processing proceeds to step S13 in which the processor 78 in conjunction with a control program stored in the memory 79, examines the change-in-pressure flag and change-in-temperature flag. If no change in temperature or change in pressure has occurred, the processor 78 in conjunction with the memory 79 builds the data frame of FIG. 25C in step S14 of FIG. 29. If only the change-in-temperature flag is set, the processor 78 in conjunction with the memory 79 builds the data frame of FIG. 25D. If only the change-in-pressure flag is set, the processor 78 in conjunction with the memory 79 will build the data frame of FIG. 25E. If both the change-in-pressure flag and the change-in-temperature flag are set, the processor 78 in conjunction with the memory 79 will build the data frame of FIG. 25F in steps S14–S17 of FIG. 29. After the processor performs one of step S17, the processor 78 will update the memory 79 with pressure, temperature, change-in-pressure and change-in-temperature data for use in determining later pressure, temperature, change-in-pressure and/or change-in-temperature data. In step S18 of FIG. 29, processing performed by the processor 78 in conjunction with the memory 79, ends after building and transmitting one format 20 data frame.

7. Operation

The operation of the subject invention as applied to well bore telemetry is described as follows. A well bore is drilled to a desired depth in the earth with drilling equipment at the well head 1. The drilling equipment is then withdrawn from the well bore. The antennas 2, 3 are hammered into the ground on opposite sides of the well head at a predetermined distance so that the well head 1 and the antennas 2, 3 are arranged more or less along a first line. The antennas 3, 4 are arranged on the same side of the well head 1 along a second line perpendicular to the first line. The antenna 3 is spaced by the predetermined distance from the well head 1, and the antenna 4 is spaced by twice the predetermined distance from the well head 1. Preferably, a dielectric solution such as rock salt or fertilizer in water is applied to the ground about the bases of the antennas 2–5.

Batteries are coupled to the remote apparatus 6 to provide its power. An operator connects the surface apparatus 7 with the remote apparatus 6 using their respective RS232 ports, and specifies various parameters for operation of the remote apparatus 6. For example, the operator can set the frequency of the carrier signal used by the remote apparatus 6, the modulation period, specify whether the remote apparatus 6 is to transmit in formats 1, 10 or 20, set the durations of the initial time delay state and the sleep state, set whether data transmission is to be continuous or discontinuous and the time duration between transmission of data frames if data transmission is to be discontinuous, for example. After the operator is finished programming the remote apparatus 6, the operator disconnects the RS232 port of the remote apparatus 6 from the surface apparatus 7. If the operator specified an initial time delay state, the remote apparatus 6 will transition to the initial transmit sequence state after duration of the initial time delay specified by the operator. If no initial time delay state was specified by the operator, the remote apparatus 6 will transition to the initial transmit sequence state. In this state, the remote apparatus 6 will transmit fixed known sequences and sensed temperature and/or pressure data so that the surface apparatus 7 can verify proper operation of the remote apparatus 6. If the remote apparatus 6 is operating properly, the remote apparatus 6 will transition to the sleep state so that the remote apparatus 6 will not consume significant amounts of power during its travel to a particular depth in the well bore. The operator places the remote apparatus 6 in the sleep state into a protective container placed in a pipe used to position the remote apparatus 6 downhole in the well bore. After positioning the remote apparatus 6 in the well bore, the remote apparatus 6 will transition to the operation state after expiration of a fixed time delay for the sleep state. The remote apparatus 6 will then sense pressure and/or temperature, and transmit data frames for the sensed pressure and/or temperature in accordance with one of formats 1, 10 or 20 as programmed by the operator. The surface apparatus 7 receives a main signal from the well head and antennas 2, 3 and a reference signal from antennas 4, 5, and uses the reference signal to eliminate noise components from the main signal. The main signal is demodulated and decoded in the surface apparatus 7. Based on the demodulated, decoded signal, the surface apparatus 7 generates a memory record, a display and/or a print-out of the pressure and/or temperature data as a function of time, for example. Preferably, the surface apparatus 7 includes a transmitter unit that can generate control data to affect transitions between the states of the remote apparatus 6 or program various parameters while the remote apparatus 6 is downhole. The surface apparatus 7 monitors the phase angle of the received signal from the downhole transmitter, and synchronizes the transmission of control data from the transmitter unit using the phase information extracted from the signal received from the remote apparatus 6. After the battery power of the remote apparatus 6 runs out, the remote apparatus 6 is retrieved for replacement of its batteries.

8. Variations

Although the invention has been described with specific illustrations and embodiments, it will be clear to those of ordinary skill in the art that various modifications may be made therein without departing from the spirit and scope of the invention as outlined in the following claims.

We claim:

1. An apparatus comprising:

a temperature sensor generating a sensed temperature signal;

a pressure sensor generating a sensed pressure signal;

a controller coupled to receive the sensed temperature signal from said temperature sensor and the sensed pressure signal from said pressure sensor, storing previous pressure and temperature data, determining change-in-pressure data based on the sensed pressure signal and the previous pressure data, determining change-in-temperature data based on the sensed temperature signal and the previous temperature data, generating extrapolated pressure data based on the previous pressure data, generating extrapolated temperature data based on the previous temperature data, determining the change-in-pressure data based on the sensed pressure signal and the extrapolated pressure data, determining the change-in-temperature data based on the sensed temperature signal and the extrapolated temperature data, generating frame data including at least one of the change-in-pressure data and the change-in-temperature data, generating a transmitter activation signal after the frame data is generated, and generating a control signal to modulate a carrier signal based on the frame data;

a wake-up delay counter coupled to said controller, generating a count checked by said controller to determine an expiration of a sleep state, said controller controlling said apparatus to enter an operation state if the count is greater than or equal to a predetermined value;

a wave generator generating the carrier signal;

a modulator coupled to said wave generator, to modulate the carrier signal based on the frame data;

a transmitter coupled to said modulator and said controller, said transmitter being activated based on the transmitter activation signal if said apparatus is in the operation state, to amplify the modulated carrier signal; and an antenna coupled to said transmitter, to generate an electromagnetic transmission signal based on the amplified, modulated carrier signal from said transmitter.

2. An apparatus as claimed in claim 1, wherein said modulator includes a phase shifter for differentially phase shift keying (DPSK) the carrier signal based on the frame data, to generate the modulated carrier signal.

3. An apparatus as claimed in claim 1, wherein the extrapolated pressure data is determined by linear extrapolation from the previous pressure data, and wherein the extrapolated temperature data is determined by linear extrapolation from the previous temperature data.

4. An apparatus as claimed in claim 1, further comprising:

a first multiplier coupled to receive a reception signal from the antenna and a sine wave having a frequency of the carrier signal, from said wave generator;

a second multiplier coupled to receive the reception signal from the antenna and a cosine wave having the frequency of the carrier signal, from said wave generator;

a first voltage-to-frequency converter coupled to said first multiplier and said wave generator, generating a first frequency-converted signal based on a high-frequency signal from said wave generator and the sine wave;

a second voltage-to-frequency converter coupled to said second multiplier and said wave generator, generating a second frequency-converted signal based on the high-frequency signal from said wave generator and the cosine wave;

a first counter coupled to said first voltage-to-frequency converter and said controller, generating a first count based on the first frequency-converted signal; and a second counter coupled to said second voltage-to-frequency converter and said controller, generating a second count based on the second frequency-converted signal;

said controller determining that a "1" or "0" bit has been transmitted based on the first and second counts.

5. An apparatus as claimed in claim 4, further comprising:

a switch unit coupled between said antenna and said first and second multipliers, and coupled to said controller, the switch unit being controlled by the controller to selectively switch between a transmission mode in which said antenna is decoupled from said first and second multipliers, and a reception mode in which said antenna is coupled to said first and second multipliers.

6. An apparatus as claimed in claim 4, wherein said modulator includes a phase shifter for differentially phase shift keying (DPSK) the carrier signal based on the frame data, to generate the modulated carrier signal.

* * * * *